United States Patent
Wray et al.

(10) Patent No.: US 11,074,476 B2
(45) Date of Patent: Jul. 27, 2021

(54) DATA INGESTION PLATFORM

(71) Applicant: AstrumU, Inc., Kirkland, WA (US)

(72) Inventors: Adam Jason Wray, Medina, WA (US); Kaj Orla Peter Pedersen, Bellevue, WA (US); Xiao Cai, Redmond, WA (US)

(73) Assignee: AstrumU, Inc., Kirkland, WA (US)

( * ) Notice: Subject to any disclaimer, the term of this patent is extended or adjusted under 35 U.S.C. 154(b) by 0 days.

(21) Appl. No.: 16/691,479

(22) Filed: Nov. 21, 2019

(65) Prior Publication Data

US 2021/0158074 A1     May 27, 2021

(51) Int. Cl.
| | |
|---|---|
| *G06F 16/904* | (2019.01) |
| *G06K 9/62* | (2006.01) |
| *G06F 16/903* | (2019.01) |
| *G06Q 10/06* | (2012.01) |
| *G06F 16/9035* | (2019.01) |
| *G06Q 10/10* | (2012.01) |

(52) U.S. Cl.
CPC .......... *G06K 9/623* (2013.01); *G06F 16/904* (2019.01); *G06F 16/9035* (2019.01); *G06F 16/90335* (2019.01); *G06Q 10/063112* (2013.01); *G06Q 10/1053* (2013.01)

(58) Field of Classification Search
CPC ............. G06F 17/3053; G06F 17/3048; G06F 17/30312; G06F 17/30371; G06F 16/90335; G06F 16/904; G06F 16/9035; G06K 9/623; G06Q 10/063112; G06Q 10/1053
USPC ........................................................ 707/706
See application file for complete search history.

(56) References Cited

U.S. PATENT DOCUMENTS 6,199,062 B1 *  3/2001  Byrne ................. G06F 16/2228
8,375,026 B1     2/2013  Elliott et al.
(Continued)

FOREIGN PATENT DOCUMENTS

WO    WO-03054727 A1 *  7/2003   ......... G06F 16/2365
WO    2020003325 A1     1/2020

OTHER PUBLICATIONS

Dillenberger et al., "Blockchain Analytics and Artificial Intelligence", Feb. 2019, IBM Journal of Research and Development, pp. 1-1. 10.1147/JRD.2019.2900638. (Year: 2019).*

(Continued)

*Primary Examiner* — Hosain T Alam
*Assistant Examiner* — Robert F May
(74) *Attorney, Agent, or Firm* — John W. Branch; Branch Partners PLLC

(57) ABSTRACT

Embodiments are directed to data ingestion over a network. Raw data and integrated data associated with a plurality of separate data sources may be provided such that the raw data includes content associated with a plurality of subjects. Categorization models may be employed to categorize the raw data based on various features, such as, format, structure, data source, variability, volume, or associated entities. Matching models may be determined based on the categorization of the of the raw data, the integrated data and the content associated with the plurality of subjects. Matching models may generate a plurality of unified facts based on the raw data and the integrated data such that each unified fact is associated with a score associated with a quality of its match with a unified schema.

28 Claims, 16 Drawing Sheets

(56) References Cited

U.S. PATENT DOCUMENTS

| | | | |
|---|---|---|---|
| 8,688,694 B2* | 4/2014 | Dexter | G06F 16/951 |
| | | | 707/726 |
| 8,943,062 B2* | 1/2015 | Baumgartner | G06F 16/285 |
| | | | 707/737 |
| 9,529,863 B1* | 12/2016 | Gindin | G06Q 40/00 |
| 2002/0055870 A1 | 5/2002 | Thomas | |
| 2004/0236598 A1* | 11/2004 | Thomsen | G06Q 10/10 |
| | | | 705/321 |
| 2006/0271421 A1 | 11/2006 | Steneker et al. | |
| 2010/0057659 A1 | 3/2010 | Phelon et al. | |
| 2013/0275446 A1* | 10/2013 | Jain | G06F 40/211 |
| | | | 707/755 |
| 2014/0089219 A1* | 3/2014 | Mathews | G06Q 50/2053 |
| | | | 705/327 |
| 2015/0088793 A1 | 3/2015 | Burgess et al. | |
| 2015/0317754 A1 | 11/2015 | Goel et al. | |
| 2016/0352760 A1 | 12/2016 | Mrkos et al. | |
| 2016/0379170 A1 | 12/2016 | Pande | |
| 2017/0024701 A1 | 1/2017 | Tang et al. | |
| 2018/0293327 A1* | 10/2018 | Miller | G06F 16/26 |
| 2019/0108217 A1 | 4/2019 | Chen | |
| 2019/0122161 A1 | 4/2019 | Cicio, Jr. | |
| 2019/0151758 A1* | 5/2019 | Anglin | A63F 13/67 |

OTHER PUBLICATIONS

Office Communication for U.S. Appl. No. 16/898,177 dated Jul. 22, 2020, pp. 1-12.

Office Communication for U.S. Appl. No. 16/898,177 dated Nov. 2, 2020, pp. 1-13.

Patel, Kayur et al., "Using Multiple Models to Understand Data," In Proceedings of the Twenty-Second international joint conference on Artificial Intelligence—vol. Two (IJCAI'11), AAAI Press, pp. 1723-1728.

Office Communication for U.S. Appl. No. 16/898,177 dated Feb. 2, 2021, pp. 1-5.

Ludwigsen, Scott, "What is Localization, and When Do You Need It?" Feb. 21, 2018 retrieved at: https://blog.languageline.com/what-is-locaiization, pp. 1-5.

Office Communication for U.S. Appl. No. 17/107,760 dated Feb. 8, 2021, pp. 1-35.

* cited by examiner

DATA INGESTION PLATFORM

TECHNICAL FIELD

The present invention relates generally to data ingestion, and more particularly, but not exclusively, to managing data ingestion from dynamic heterogeneous data sources.

BACKGROUND

Modern computing often requires the collection, processing, or storage of large data sets. In some cases, ingested data may be provided from a relatively unbounded variety of data sources having different formats, interfaces, categories of information, or the like. Also, in some cases, ingested data may include a combination of structured or unstructured data that may require special handling. Also, in some cases, sensitive or private data may require special management to meet commercial or regulatory requirements. In combination, data variety, data volume, variation, or the like, may present difficulties that may inhibit efficient collection, management, or use of disparate but related data. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
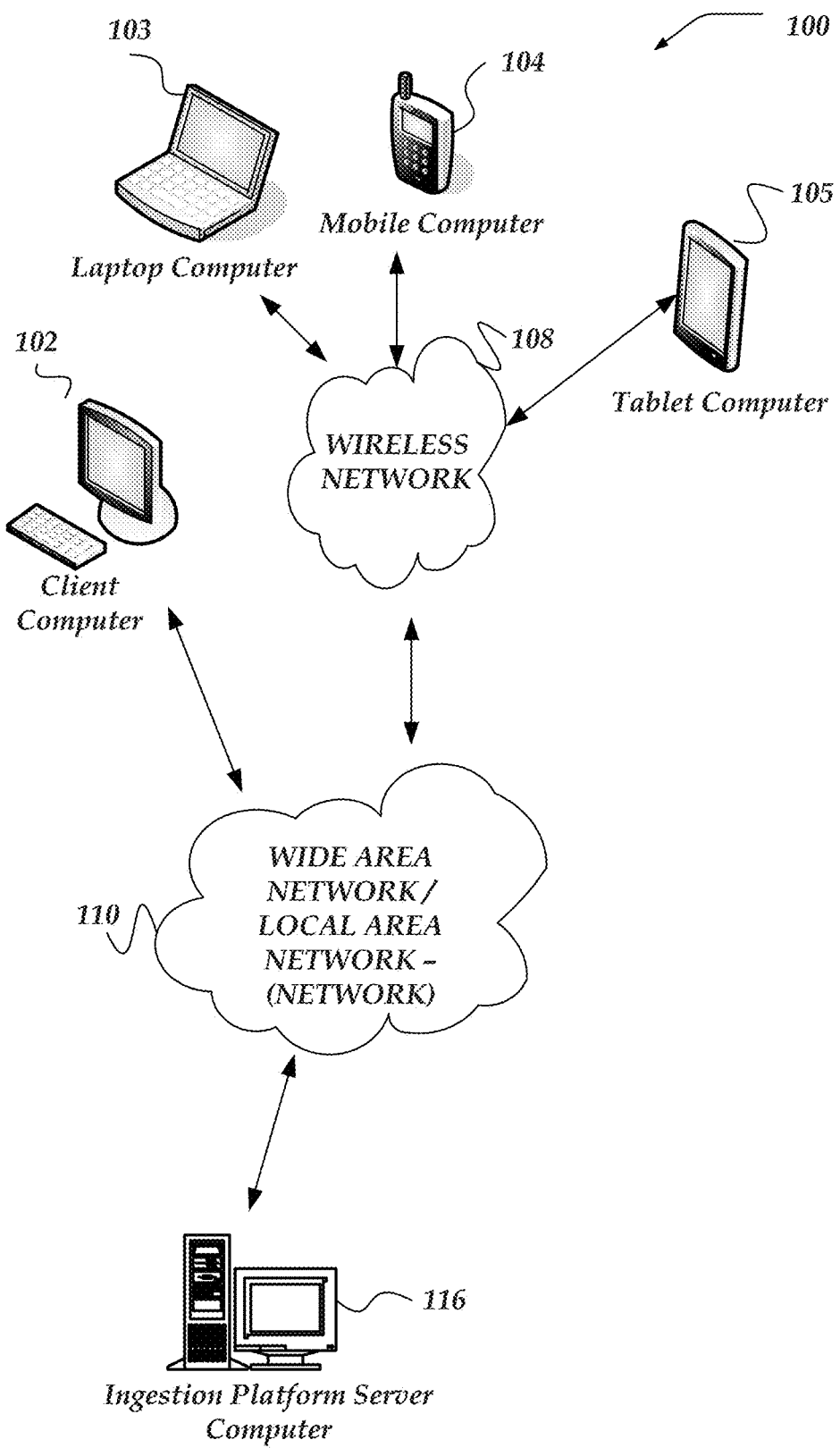
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a data ingestion platform.

As used herein the term "integrated data source" refers to a data source that enables closer coordination with a data ingestion platform. In some cases, the data provided by an integrated data source may be formatted or otherwise configured to facilitate its use by a data ingestion platform.

As used herein the term "raw data" refers to data provided by a raw data source. Raw data may include structured or unstructured data, documents, streams, or the like. Provided data may be considered as raw because the data source may provide the data in a form or format "as-is."

As used herein the term "integrated data" refers to data provided by an integrated data source. Similar to raw data, integrated data may include structured or unstructured data, documents, streams, or the like. However, the provided data may be considered integrated data rather than raw because the data source may be arranged or configured to provide the data in a form or format that is consistent with one or more requirements of a data ingestion platform. Also, in some cases, integrated data may include information presumed to represent truths, such as, government or standard based codes, demographic information, or the like.

As used herein the term "categorization model" refers one or more data structures that encapsulate the data, rules, machine learning models, machine learning classifiers, or instructions that may be employed to associate a raw data with a raw data category. Categorization models may include various components, such as, one or more machine learning based classifiers, heuristics, rules, pattern matching, conditions, or the like, that may be employed to assign data to a category. In some cases, categorization models may provide confidence scores that represent the quality of the categorizations. In some cases, categorization engines may employ one or more categorization models to categorize incoming raw data assets. For example, category models may be employed to determine if a document is a student transcript, resume, job listing, job description, course description, course catalog, or the like.

As used herein the term "matching model" refers one or more data structures that encapsulate the data, rules, machine learning models, machine learning classifiers, or instructions that may be employed to match or map information included in raw data assets to a unified schema. Matching models may include various components, such as, one or more machine learning based classifiers, heuristics, rules, pattern matching, conditions, or the like, that may be employed to match or map information in raw data assets to a unified schema. In some cases, matching models may provide confidence scores that represent the quality of the matches. Different matching models may be provided for different categories of raw data assets. For example, one matching model may be directed to matching information included in course descriptions while another matching model may be directed to matching information included in resumes. Likewise, in some cases, one matching model may be arranged to match information for more than one category of raw data. Also, in some cases, more than one matching models may be arranged to match the same category of data.

As used herein the term "profile model" refers one or more data structures that encapsulate the data, rules, or instructions that may be employed to generate profiles based on the ingested data. For example, a profile model may include rules or instructions for generating a student profile from ingested data.

As used herein the term "unified schema" refers a data schema that may be used to define the entities, fields, or attributes of a common data store. Information included in raw data may be matched to entities, fields, or attributes defined by a unified schema.

As used herein the term "unified fact" refers to one or more data structures or records that include values that conform to a unified schema. Information included in raw data may be mapped to unified facts that conform to a unified schema.

As used herein the term "subject" refers to an entity, such as, a user, student, organization, person, or the like. Various information included in some raw data may be associated with one or more subjects.

As used herein the term "subject fact" refers to one or more data structures, values, or records that represent unified facts that are owned or associated with a subject. Subject facts may often be information that may be considered personally identifiable information. For example, ingested information that is associated with an individual student, such as, name, address, course of study, transcripts, grades, or the like, may be considered subject facts.

As used herein the term "non-subject fact" refers to one or more data structures, values, or records that represent unified facts that are not considered sensitive or otherwise directly associated with a subject. In some cases, non-subject facts may be derived or computed from subject facts. For example, federal job codes may be considered non-subject facts. Also, for example, aggregate data, such as, average student body grade point average, course of study distribution information, or the like, may be considered non-subject data.

As used herein the term "profile" refers to one or more data structures or records gathered together to provide information about a subject. For example, a student profile may include various subject facts or non-subject facts that are relevant to a particular student.

As used herein the term "selection score" refers to a score that may be employed to select a unified fact value from among different results produced by different matching models and the same raw data. In some cases, selection scores may be generated based on the confidence score of a given result and a reputation score of the matching model that produced the results.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to data ingestion over a network.

In one or more of the various embodiments, raw data and integrated data associated with a plurality of separate data sources may be provided such that the raw data includes content associated with a plurality of subjects.

In one or more of the various embodiments, one or more categorization models may be employed to categorize one or more portions of the raw data based on one or more of a format of the raw data, a structure of the raw data, a data source providing the raw data, or an entity associated with the data source.

In one or more of the various embodiments, one or more matching models may be determined based on the categorization of the one or more portions of the raw data, the integrated data and the content associated with the plurality of subjects.

In one or more of the various embodiments, the one or more matching models may be employed to generate a plurality of unified facts based on the raw data and the integrated data such that each unified fact is associated with a score associated with a quality of its match with a unified schema, and such that the plurality of unified facts includes both a plurality of subject facts that are associated with the plurality subjects and a plurality of non-subject facts.

In one or more of the various embodiments, one or more profile models may be employed to generate one or more profiles that correspond to each subject based on the plurality of unified facts such that the one or more profiles include one or more subject facts and one or more non-subject facts.

In one or more of the various embodiments, one or more reports may be provided based on the one or more profiles.

In one or more of the various embodiments, one or more subject identifiers may be associated with each subject fact such that each subject identifier corresponds a subject of the plurality of subjects that is associated with each subject fact; in one or more of the various embodiments, one or more records of one or more actions associated with the one or more profiles may be generated such that each record includes the one or more subject identifiers associated with each subject fact associated with the one or more actions; in one or more of the various embodiments, the one or more records may be employed to determine one or more removable subject facts based on a subject identifier associated with a removable subject; and, in one or more of the various embodiments, the one or more removable subject facts may be removed from the one or more profiles.

In one or more of the various embodiments, one or more raw data sources may be provided; one or more communication protocols associated with the one or more raw data sources may be determined; one or more acquisition agents may be determined for the one or more raw data sources based on the one or more communication protocols; and the one or more acquisition agents may be employed to provide the raw data.

In one or more of the various embodiments, providing raw data associated with the plurality of separate data sources may include: providing one or more data sources associated with one or more educational institutions, including one or more of a university, a college, a vocational school, a primary school, or a secondary school; employing the one or more data sources associated with the one or more educational institutions to provide a portion of the plurality of subject facts such that the portion of the plurality of subject facts include one or more of student transcripts, student coursework, student extracurricular activities, student resumes, student discipline information, or student self-reporting information; and employing the one or more data sources associated with the one or more educational institutions to provide a portion of the plurality of non-subject facts such that the portion of the plurality of non-subject facts may include one or more of course catalogs, course syllabi, program information, tuition information, or the like, depending on applicable regulatory frameworks or other agreements.

In one or more of the various embodiments, providing raw data associated with the plurality of separate data sources, may include: providing one or more data sources associated with one or more employers; employing the one or more data sources associated with the one or more employers to provide a portion of the plurality of subject facts such that the portion of the plurality of subject facts include one or more of individual employee compensation information, individual employee performance review information; individual employee satisfaction information, individual employee resumes, individual employee application information, individual employee interview information, and individual employee exit interview information; and employing the one or more data sources associated with the one or more employers to provide a portion of the plurality of non-subject facts such that the portion of the plurality of non-subject facts include one or more of job descriptions, job advertisement information, or aggregate employee demographic information.

In one or more of the various embodiments, a confidence score that is associated with the categorization of the one or more portions of the raw data may be provided; and in response to the confidence score being less than a threshold value, further actions may performed, including one or more of triggering additional review of the one or more portions of raw data, triggering a review of the one or more categorization models, generating one or more notifications associated with the one or more portions of raw data.

In one or more of the various embodiments, generating the plurality of unified facts may include: determining one or more untrusted facts based on an associated quality of match score being less than a threshold value such that the threshold value may be a different value for different matching models; and performing one or more actions, including one or more discarding the one or more untrusted facts, storing the one or more untrusted facts in another data store, triggering a review of the one or more untrusted facts, or triggering a review of the one or more matching models.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, ingestion platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, ingestion platform server computer 116, or other computers.

Client computers 102-105 may further be configured to include a client application that enables an end-user to log into an end-user account that may be managed by another computer, such as ingestion platform server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by ingestion platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, ingestion platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of ingestion platform server computer 116 is described in more detail below in conjunction with FIG. 3. Although FIG. 1 illustrates ingestion platform server computer 116, or the like, each as a single computer, the innovations or embodiments are not so limited. For example, one or more functions of ingestion platform server computer 116, or the like, may be distributed across one or more distinct network computers. Moreover, in one or more embodiments, ingestion platform server computer 116 may be implemented using a plurality of network computers. Further, in one or more of the various embodiments, ingestion platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
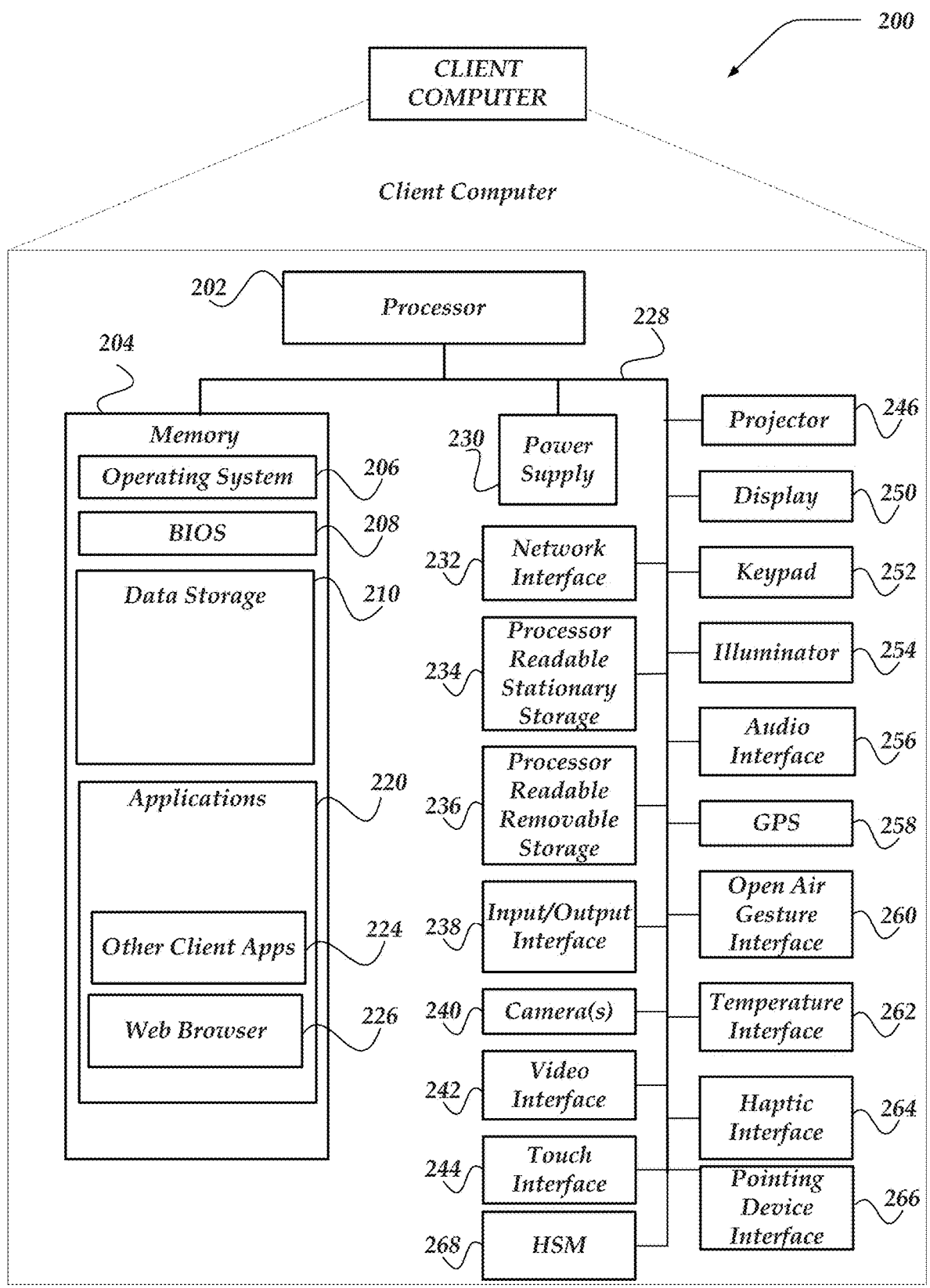
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
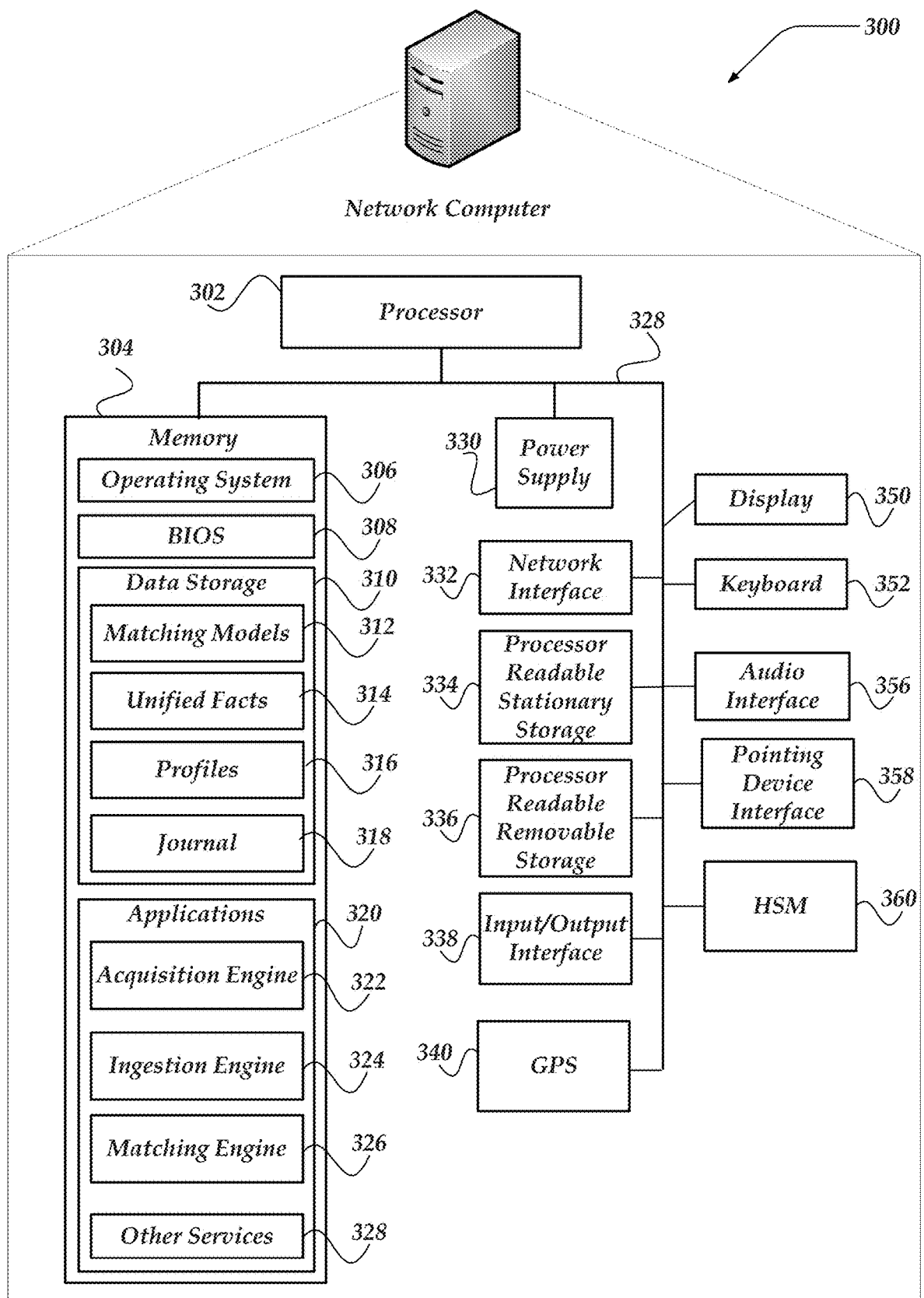
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as ingestion platform server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, acquisition engine 322, ingestion engine 324, matching engine 326, other services 328, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, matching models 312, unified facts 314, profiles 316, journal 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include acquisition engine 322, ingestion engine 324, matching engine 326, other services 328, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, acquisition engine 322, ingestion engine 324, matching engine 326, other services 328, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to acquisition engine 322, ingestion engine 324, matching engine 326, other services 328, or the like, may be provisioned and de-commissioned automatically.

Also, in one or more of the various embodiments, acquisition engine 322, ingestion engine 324, matching engine 326, other services 328, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
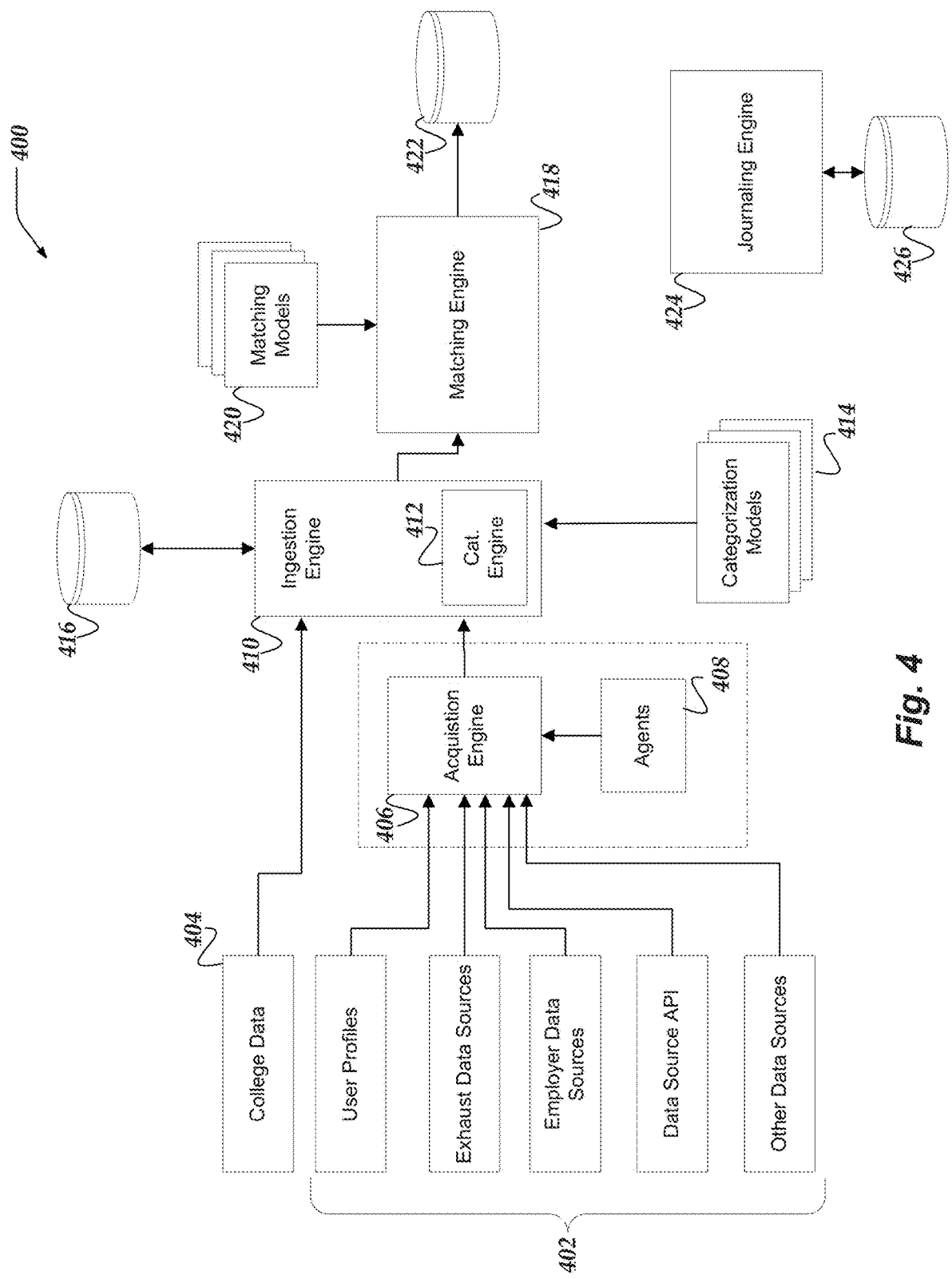
FIG. 4 illustrates a logical architecture of system for data ingestion platform in accordance with one or more of the various embodiments.

FIG. 4 illustrates a logical architecture of system 400 for data ingestion platform in accordance with one or more of the various embodiments. In one or more of the various embodiments, system 400 may include several data sources, such as, raw data sources 402, integrated data sources 404, or the like. Also, in some embodiments, system 400 may include one or more acquisition engines, such as, acquisition engine 406, that may be arranged to employ one or more agents 408 to acquire raw data or integrated data from one or more the data sources.

In one or more of the various embodiments, system 400 may be arranged to include one or more ingestion engines, such as, ingestion engine 410. In some embodiments, system 400 may be arranged to include one or more categorization engines, such as, categorization engine 412 that may employ one or more categorization models, such as, categorization models 414 to categorize raw data assets.

In one or more of the various embodiments, system 400 may be arranged to include one or more matching engines, such as, matching engine 418 that may be arranged to employ one or more matching models, such as, matching models 420 to match information included in raw data to a unified schema.

In one or more of the various embodiments, system 400 may be arranged to include one or more data stores, such as: data store 416 for storing some or all raw data assets; data store 422 for storing unified facts, profiles, or the like.

In one or more of the various embodiments, system 400 may be arranged to include one or more journal engines, such as journal engine 424. In some embodiments, journal engines, such as, journal engine 424 may employ one or more journal data stores, such as, journal data store 426.

Advances in so-called big data computing has enabled relatively unbounded data scale or processing scale, enabling very large data sets to be acquired, stored, or processed. Further, the application of machine-learning techniques to very large data has enabled many advances across several industries. Machine learning, as well as other analytic data processing, have been used to provide useful inferences, predictions, or insights based on analyzing large data sets. However, useful analytic methods often require large well-defined data sets. Thus, in some cases, while there may be a large amount of data available, in some problem domains, the data required to provide useful inferences or predictions may be scattered across many sources or in many formats. In addition, often organizations or data heavy problems that may be nominally considered to be in the same domain may arrange their data differently, using different schemas, concepts, definitions, coding, or the like.

Also, in some cases, data that may be useful for analytics may be available via unconventional locations that may be difficult for computers to process rather than being stored in databases, document management systems, networked/online repositories, or the like. For example, in some cases, useful information may be available on public facing websites or social media platforms.

Also, in some cases, data that may be useful for analytics may originally be intended for human consumption rather than machine consumption. In some cases, data provided by websites, publications, reports, or the like, may include language that may be difficult for machines to automatically process. For example, public facing websites may include content that includes local idioms, colloquialisms, style-elements, or the like, that may vary across regions or organizations, even if they may be directed to the same problem domain.

Accordingly, in some cases, for some problem domains, the value of big-data analytics may be diminished because the necessary data may be stored in disparate data sources that may be difficult or expensive for conventional data ingestion systems to merge into a usable data set.

While, in some cases, conventional data ingestion systems may be carefully configured and tuned to automatically ingest data from a variety of sources, including new or additional data sources may be prohibitively expensive because it may require additional technical resources to manually adapt to the new formats, protocols, or conventions that may be introduced by the new or additional data sources.

The problems or difficulties associated with large scale data ingestion across multiple sources may be further exacerbated if data from different domains may be required for analytics. Accordingly, to the extent that merging data from different sources in the same domain may be difficult, merging data from two or more domains, even related domains, may be even more difficult. Thus, in some cases, data ingestion may become an intractable problem for conventional data ingestion systems as disparate data source or disparate domains are introduced.

Accordingly, in one or more of the various embodiments, the innovations disclosed herein may improve the ability of data ingestion platforms, such as, data ingestion platform 400 to provide data for big-data analytics. In one or more of the various embodiments, data ingestion platform 400 may be arranged to acquire raw data from a variety of raw data sources, such as, raw data sources 402 or one or more integrated data sources, such as, integrated data source 404.

In one or more of the various embodiments, data ingestion platform 400 may include an acquisition engine, such as, acquisition engine 406. In some embodiments, acquisition engines may be arranged to employ one or more acquisition agents, such as, acquisition agents 408, to acquire raw data from data sources, such as, data sources 402.

In one or more of the various embodiments, acquisition agents may be arranged to include or define rules or instructions that may be executed to acquire data from one or more data sources. In some embodiments, acquisition agents may be arranged to collect raw data from private or public data sources. In some embodiments, acquisition agents may be arranged to apply credentials, communication protocols, filters, site navigation (e.g., crawlers, robots, or the like), or the like, to collect raw data from one or more data sources. For example, in some embodiments, different acquisition agents may be arranged to employ TCP/IP, UDP, FTP, HTTP, or the like, to interface with data sources to acquire raw data. In some embodiments, individual acquisition agents may be arranged to employ one or more recipes or scripts that enable raw data to be collected from a given data source. For example, if the data source is a web site, its associated acquisition agent may include a machine driven web-agent component that executes HTTP requests that may mimic a person operating web browser to obtain the raw data associated provided by the data source.

In one or more of the various embodiments, acquisition agents may be arranged to execute API calls or transactions configured for a particular data source. Likewise, in some embodiments, acquisition agents may be arranged to perform actions to provide the security credentials that enable access to data sources. In some embodiments, acquisition agents may be configured to store or reference the credentials for a particular data source, such as, usernames, password, key phrases, cryptographic certificates, or the like.

In one or more of the various embodiments, if two or more data sources have common features or behavior, an acquisition agent may be employed for the two or more different data sources.

In one or more of the various embodiments, acquisition agents may be arranged to require little if any configuration for a particular data source. Also, in one or more of the various embodiments, acquisition agents may be arranged to acquire raw data that may be provided to an ingestion engine. Accordingly, in one or more of the various embodiments, acquisition agents or the configuration of individual acquisition agents may operate on data sources independent of the peculiarity of the contents among different data sources. Further, in one or more of the various embodiments, because acquisition agents may be arranged to pass raw data to ingestion engines absent contextual processing, changes in the content may not require modifications in the acquisition agents.

In one or more of the various embodiments, employing acquisition agents as disclosed herein may be advantageous because they may be relatively lightweight or simple to configure because they do not attempt to interpret or analyze the context or content of raw data collected from data sources. For example, an acquisition agent arranged to crawl a public facing website does not require modification if the content of the website is updated or rearranged. This feature may at least reduce costly integration or customization each time a data source owner modifies the content.

Also, in one or more of the various embodiments, additional acquisition agents may be added to a data ingestion platform without impacting existing acquisition agents or existing interfaces with other data sources.

In one or more of the various embodiments, if an acquisition engine, such as, acquisition engine 406 collects raw data from a data source, the raw data may be provided to an ingestion engine, such as, ingestion engine 410.

In one or more of the various embodiments, in some cases, one or more data sources may be considered integrated data sources, such as, integrated data source 404. In some embodiments, integrated data sources may be data sources that may be closely integrated with a data ingestion platform such that acquisition agents may be not be required. For example, one or more partner organizations may closely share data by exposing services or tools that enable direct integration with a data ingestion platform rather than relying on acquisition agents. However, in some embodiments, data ingestion platforms may employ specialized acquisition agents to collect data from integrated data sources.

Further, in some embodiments, one or more integrated data sources may be considered to provide integrated data to data ingestion platforms rather than providing raw data. In one or more of the various embodiments, integrated data may be data that does not require the same amount of parsing or matching effort as raw data. In some embodiments, integrated data provided from an integrated data source may conform to a unified schema such that the integrated data requires little or no processing before it may be added to a unified fact database. In some embodiments, an integrated data source may provide true facts that may be stored directly into a unified fact database, such as, codes provided by a regulatory body. For example, for some embodiments, an integrated data source may provide lists of postal codes, tax codes, agency codes, or the like. For example, for some embodiments, a data source that provides the codes for the US Department of Labor Standard Occupation Classification System may be considered an integrated data source that provides integrated data.

In one or more of the various embodiments, in some cases, raw data provided to an ingestion engine may be provided with little context. Accordingly, in some embodiments, an ingestion engine may be arranged to attempt to categorize the raw data before attempting to ingest it. Categorization may be based on one or more of format classification, content/context classification, or the like. For example, if the raw data is a document, it may be advantageous to categorize the raw document based on the format of the document. For example, in some embodiments, raw data comprised of a MS Word document may require different processing than raw data comprised of PDF documents. Note, in some embodiments, an acquisition engine may be arranged to perform some or all of the format categorization. For example, acquisition engines may provide acquisition agents that may be directed to converting different document formats into other formats, such as, plain text before the raw data is provided to the ingestion engine. In some embodiments, this may include executing one or more complex processes such as optical character recognition, language translation, or the like. In some embodiments, format categorization or data conversion processing may include employing one or more external or third-party services to perform some or all of the processing.

In one or more of the various embodiments, categorization may include determining the category of the content. In one or more of the various embodiments, the particular categories may be determined based on the problem domain. In one or more of the various embodiments, preliminary content categorization may enable downstream processing to be focused on particular categories. For example, matching models employed to map information in raw data to unified facts may be directed to particular or limited content categories enabling matching models to be tuned, trained, or evaluated with respect to one or more categories of content rather than all content. In some embodiments, this may enable matching models for individual content categories to be updated or replaced without impacting matching models for other content categories.

Also, in one or more of the various embodiments, pre-match categorization may enable different types of matching models to selectively be employed for different categories. For example, it may be more effective to process some categories of raw data using matching models that employ more heuristic techniques rather than employing matching models that use more machine-learning techniques.

Accordingly, in one or more of the various embodiments, data ingestion platforms may include one or more categorization engines, such as, categorization engine 412. In some embodiments, categorization engines may be arranged to employ one or more categorization models that encapsulate the rules, instructions, patterns, conditions, machine-learning classifiers, or the like, that may be used to categorize raw data.

In one or more of the various embodiments, if raw data may be categorized, it may be provided to a matching engine, such as, matching engine 418. In one or more of the various embodiments, matching engines may be arranged to employ one or more matching models to generate unified facts from the information included in the raw data. In one or more of the various embodiments, matching engines may employ one or more matching models that interpret some or all of the raw data to extract unified facts from the raw data.

In one or more of the various embodiments, matching models may be arranged to provide unified facts that conform to a unified schema. In one or more of the various embodiments, each unified fact may be associated with a field, attribute, class, or object defined in the unified schema. Also, in some embodiments, matching models may be arranged to provide a confidence score that indicates the quality of match from the point of view of an individual matching model. Accordingly, in one or more of the various embodiments, matching models may be arranged to provide results that include: the unified fact value; the field name, class name, object name, or the like, as per the unified schema; the confidence score representing the quality of the match; or the like.

In some embodiments, two or more matching models may be directed to the same category of content. Accordingly, in some embodiments, each matching model may be associated with a reputation score that may be employed to select among differing results provided by different matching models for the same raw data. Further, in some embodiments, a reputation score associated with a matching model may be employed to weight confidence scores or generate selection scores.

In one or more of the various embodiments, reputation scores for matching models may be determined in part based on feedback or telemetry associated with users or administrators.

In one or more of the various embodiments, if unified facts may be generated from the raw data, the unified facts may be stored in a unified fact database, such as, unified fact database 422. In some embodiments, data ingestion platforms may be arranged to require unified facts to be associated with a confidence score that exceeds a defined threshold value before storing them in the unified fact database.

In one or more of the various embodiments, raw data that results in unified facts with insufficient confidence scores may be flagged for review by an administrator. Accordingly, the administrators may review the results, raw data, matching models, or the like, to determine the reasons for the low confidence score result.

Further, in one or more of the various embodiments, unified facts generated by matching engines may comprise subject facts and non-subject facts. In some embodiments, subject facts may be facts directly associated with a subject. In some embodiments, subjects may include persons or organizations. Thus, in some embodiments, subject facts may include personal, sensitive, or confidential information associated with a subject. For example, if a subject is a student, subject facts may include name, address, age, resume information, course grades, employment information, or the like. Accordingly, in one or more of the various embodiments, one or more matching models may be arranged to determine if a unified fact may be a subject fact. Also, in one or more of the various embodiments, subject facts may be associated with a subject identifier that corresponds to the subject.

In one or more of the various embodiments, data ingestion platforms may be arranged to trace the activity associated with subject facts such that subject facts associated with given subject may be definitively removed from the data ingestion platform upon request.

Accordingly, in one or more of the various embodiments, data ingestion platforms may be arranged to include one or more journaling engines, such as, journaling engine 424. In some embodiments, journaling engines may be arranged to generate journal records for each action associated with subject facts. In one or more of the various embodiments, journal records may be stored in one or more journal data stores (e.g., journals), such as, journal data store 426. Thus, in the response to a removal request, or the like, the journal records may be employed to determine how to remove the removable subject facts from the data ingestion platform.

Figure 5:
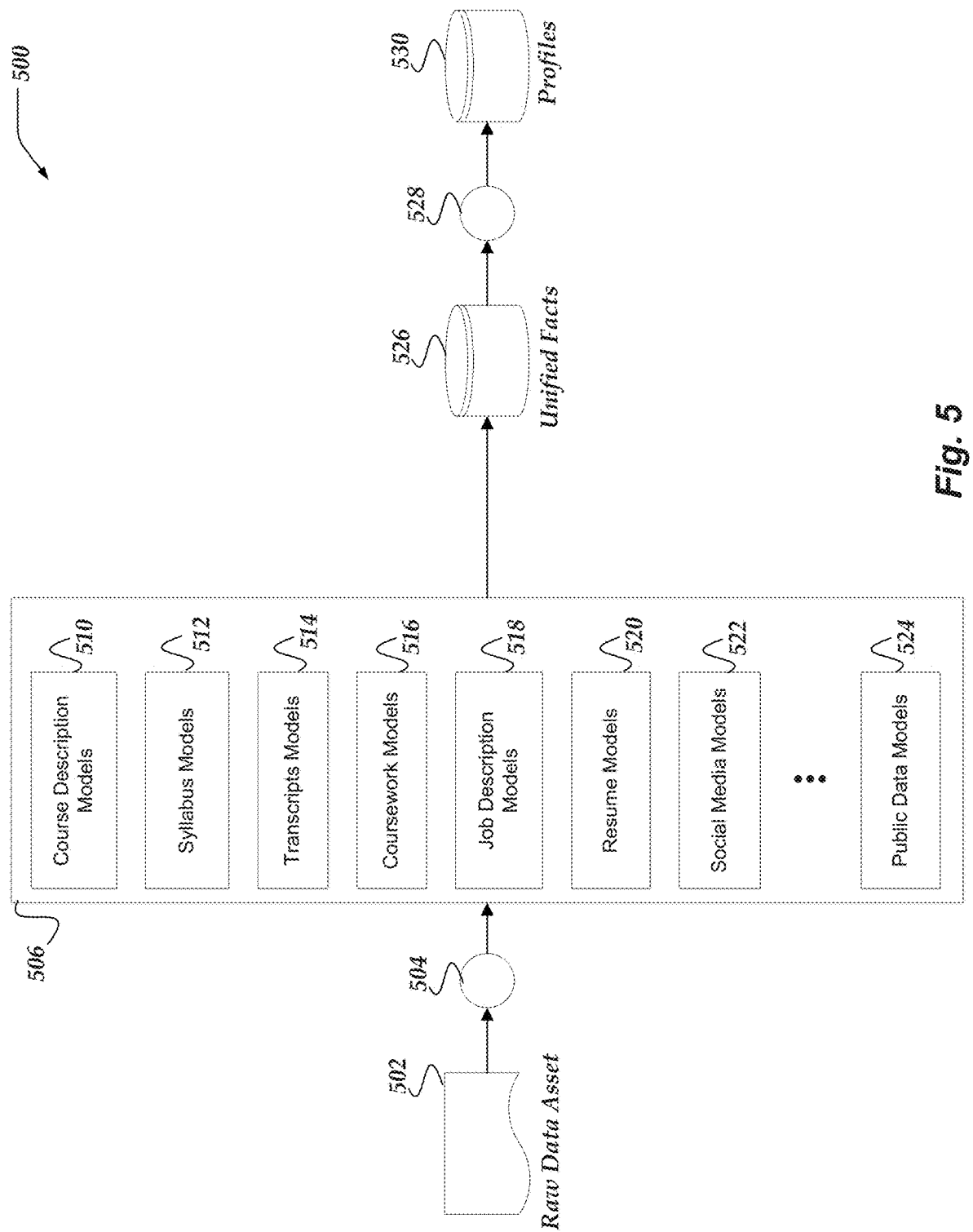
FIG. 5 illustrates a logical schematic of a system for data ingestion platform in accordance with one or more of the various embodiments.

FIG. 5 illustrates a logical schematic of system 500 for data ingestion platform in accordance with one or more of the various embodiments. In some embodiments, system 500 may be arranged to receive a raw data asset, such as, raw data asset 502. In some embodiments, raw data asset 502 may be categorized or otherwise pre-processed via one or more components, represented by component 504. For example, in some embodiments, component 504 may be a categorization engine, or the like.

In one or more of the various embodiments, raw data asset 502 may be provided to a matching engine, such as, matching engine 506. Accordingly, in one or more of the various embodiments, matching engine 506 may be arranged to employ one or more matching models that may be arranged to match some or all of information included in raw data asset 502 to one or more unified facts.

In one or more of the various embodiments, processes performed by components 504 may include categorizing raw data asset 502 and then based on the result of the categorization, one or more matching models arranged for interpreting the category of data that has been associated with raw data asset 502.

In one or more of the various embodiments, matching models may be arranged to process data assets associated with one or more categories that may represent a specific topics or information classes. In this example, raw data asset 502 may be associated with students, schools, employers, or the like. Thus, in this example, matching models may be targeted to different types of raw data assets. Accordingly, in one or more of the various embodiments, matching models may include course description models 510, syllabus models 512, student transcript models 514, coursework models 516, job description models 518, resume models 520, social media models 522, public data models 524, or the like.

Accordingly, in one or more of the various embodiments, matching engine 506 may execute one or more matching operations based on heuristics, machine learning classifiers, machine learning models, rules, instructions, or the like, defined or referenced by the one or more matching models. In some embodiments, matching operations may include identifying information included in the raw data that can be matched to a unified schema to provide unified facts.

In one or more of the various embodiments, unified facts generated by the matching engine may be stored in a unified fact data store, such as, data store 526.

In one or more of the various embodiments, the unified facts may be employed to generate various profiles, such as, student profiles, employer profiles, school profiles, or the like, that may be used for providing reports (interactive or otherwise) to users of a data ingestion system.

In one or more of the various embodiments, profiles may be comprised of one or more unified facts that may include one or more subject facts or one or more non-subject facts. In some embodiments, a profile engine may be arranged to employ profile models to determine the contents of a profile. In some embodiments, profiles may be arranged to encapsulate the rules, heuristics, machine-learning classifiers, or the like, that may be employed to generate profiles based on one or more unified facts.

Figure 6:
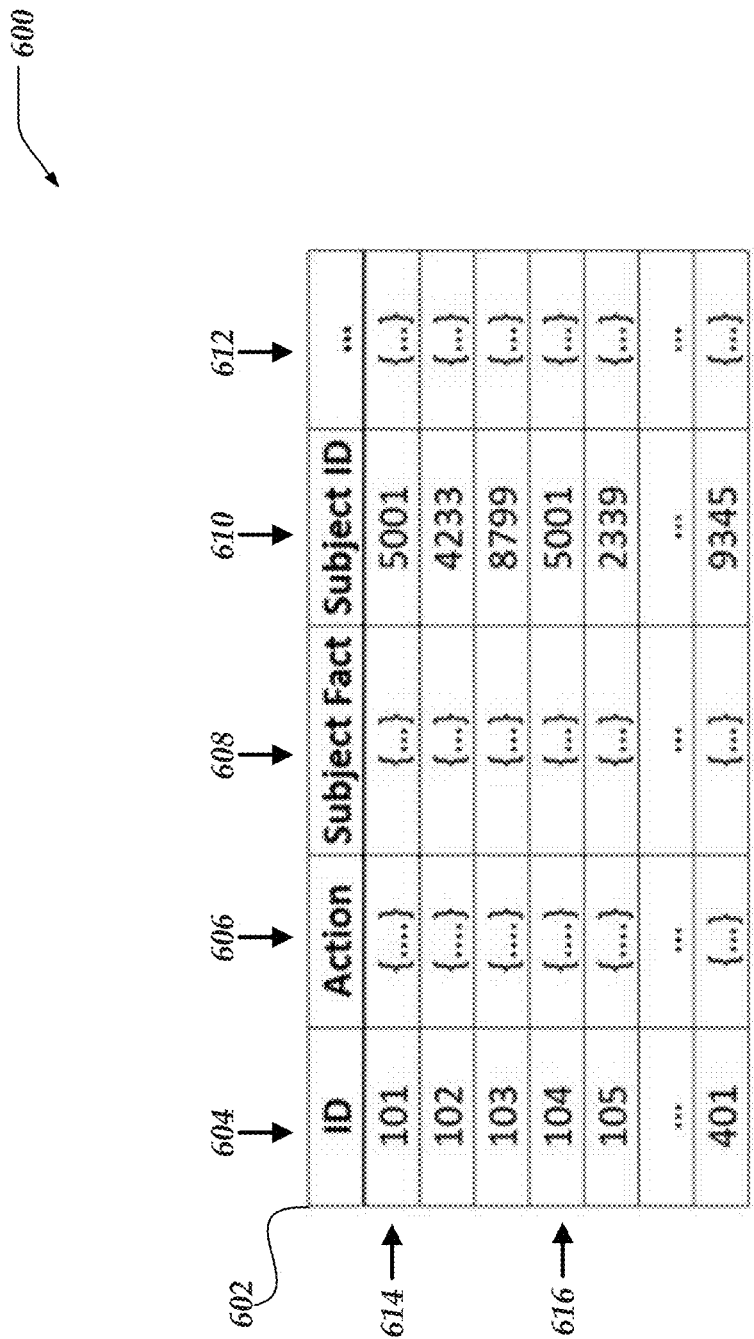
FIG. 6 illustrates a logical representation of a journal for a data ingestion platform in accordance with one or more of the various embodiments.

FIG. 6 illustrates a logical representation of journal 600 for a data ingestion platform in accordance with one or more of the various embodiments. In one or more of the various embodiments, in this example, for brevity or clarity, journal 600 is represented using a tabular format. However, one of ordinary skill in the art will appreciate that journal 600 may be implemented using one or more conventional or custom data structures or formats, include database tables, XML, files, CSV files, unstructured text records, graph databases, or the like, or combination thereof, without departing from the disclosed innovations. Similarly, in one or more of the various embodiments, one of ordinary skill in the art will appreciate that the disclosed innovations anticipate journals may include different columns/attributes that may be in different order. Further, in some embodiments, one or more of the columns of journal 600 may be combined or omitted as long as a capability to associate subject facts actions with subject facts and subject identifiers.

In one or more of the various embodiments, table 602 may be arranged to store one or more journal records that include various information about actions that may have been performed on subject facts. In this example, column 604 may be employed for storing journal record identifiers, column 606 may be employed for storing action information, column 608, may be employed for storing subject fact information, column 610 may be employed for storing subject identifiers, and one or more other columns, such as, column 612 may be employed for storing other information.

In one or more of the various embodiments, action information stored in column 606 may include tags, codes, narratives, or the like, that represent one or more actions associated with a subject fact. In some embodiments, action information may include serialized data structures, such as, JSON objects, or the like. For example, in some embodiments, action information, such as, "ADDED TO UNIFIED FACT DATABASE", or the like, may be used indicated that a subject fact has been stored in a unified fact database. Other actions values may include values that represent other actions on subject facts, such as, deleting, moving, linking, associating, de-associating, editing, or the like.

In one or more of the various embodiments, a journal engine may be arranged to employ configuration information to determine the particular coding, or representations that may be used for storing actions in journal 600.

In one or more of the various embodiments, column 608 may employed to store information about the subject fact associated with the record. In some embodiments, the subject fact information may include a reference to another data store or record that include the subject fact information. In some embodiments, the subject fact information may vary depending on the action information or the type of subject fact (as defined via the unified schema). For example, if the action indicates a new subject fact has been added to a unified fact database, the subject fact information may include (or reference) the initial value of the subject fact. However, in one or more of the various embodiments, subject fact information may include other information, including meta-data describing the source of the subject fact, a confidence score associated with the matching model used to extract the subject fact from raw data, the age of the data, the age of the match, other timestamp information, or the like.

In one or more of the various embodiments, column 610 may store a value that may be used to identify the subject associated with the subject fact. In some embodiments, subject identifiers may be anonymized values rather values that may be used to represent a person subject. In some embodiments, the subject identifier may be unique within the scope of the data ingestion system to enable subject facts associated with a subject to unambiguously determined.

In one or more of the various embodiments, column 612 may be employed to store other journal information, such as, identifiers that may indicate that the user that performed the action, other timestamps, or the like.

In this example, for some embodiments, record 614, represents the occurrence of an activity associated with a subject fact owned or associated with a subject identified as subject 5001. Likewise, record 616, represents other activity that may be associated with the same or other subject fact that is also owned or associated with the same subject.

In one or more of the various embodiments, each time an ingestion platform performs action associated with a subject fact, a journal record that memorializes the occurrence may be generated and stored in the journal. Accordingly, in some embodiments, the ingestion platform may be enabled to definitively trace the locations or associations of subject facts. In some embodiments, this may enable the data ingestion platform to ensure that if subject facts need to be deleted from the data ingestion platform, all copies, links, or references to the subject facts being removed may be definitively determined.

Accordingly, in one or more of the various embodiments, if a subject needs to be removed from the data ingestion platform, all of the subject facts associated with the removed subject may be removed from the platform. For example, in some embodiments, if a student, school, or employer, decides to opt-out or otherwise disengage with the data ingestion platform, the subject facts associated with that subject may be definitively determined and removed from the data ingestion platform.

In one or more of the various embodiments, in response to a removal request from a subject (e.g., opt-out requests, erasure requests, or the like), a data ingestion platform may determine the subject identifier of the subject. The subject identifier may be used to determine the journal records associated with the subject. Accordingly, in some embodiments, the journal records may be evaluated to determine the actions that need to be performed to satisfy the removal request. For example, in some embodiments, if a journal record shows that a subject fact has been linked or included in one or more profiles or one or more reports, the data ingestion platform may take actions, such as, un-linking the subject fact from the one or more profiles or removing it from the one or more reports. Also, if additional cleanup actions need to be performed, such actions may be defined in configuration information, or the like. For example, in some embodiments, if a subject fact is removed from a profile, the profile may be adjusted by deleting the fact, replacing the fact with a non-subject fact, or the like. In some embodiments, replacing a subject fact with a non-subject fact may include replacing the subject fact with one or more default values, or the like.

However, in one or more of the various embodiments, data ingestion platforms may have generated one or more non-subject facts based on subject facts, such as, aggregate values that may be based on subject facts. Thus, for example, a non-subject facts, such as, medians, means, trend lines, macro-predictions, trained machine-learning models, aggregate visualizations, or the like, may remain in the data ingestion platform even though some or all underlying the subject facts may have been deleted from the data ingestion platforms.

In one or more of the various embodiments, data ingestion platforms may be arranged to employ rules or instructions to determine if one or more non-subject facts may be retained if underlying subjects or subjects are deleted from a data ingestion platform. For example, in some embodiments, some non-subject facts that are aggregates of subject facts may be considered quasi-subject facts if the population of subjects contributing to the aggregate non-subject fact is so small that the subject may still be identified. For example, for some embodiments, if the data ingestion platform has a non-subject fact that represents the number of graduates for a particular college major, in some cases, the number of subjects graduating in some majors in some years may be so small that identities of individual subjects may be readily inferred. Accordingly, in some embodiments, data ingestion platforms may be arranged to employ rules, instructions, threshold values, or the like, to determine if non-subject facts may be retained if subjects are deleted from the data ingestion platform. In one or more of the various embodiments, how a given non-subject fact may be handled after the deletion of one or more related subjects may be determined based on configuration information that includes rules, threshold values, instructions, or the like.

Generalized Operations

FIGS. 7-16 represent generalized operations for data ingestion platform in accordance with one or more of the various embodiments. In one or more of the various embodiments, processes 700, 800, 900, 1000, 1100, 1200, 1300, 1400, 1500, and 1600 described in conjunction with FIGS. 7-16 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-16 may perform actions for data ingestion platform in accordance with at least one of the various embodiments or architectures such as those described in conjunction with FIGS. 4-6. Further, in one or more of the various embodiments, some or all of the actions performed by processes 700, 800, 900, 1000, 1100, 1200, 1300, 1400, 1500, and 1600 may be executed in part by acquisition engine 322, ingestion engine 324, matching engine 326, or the like.

Figure 7:
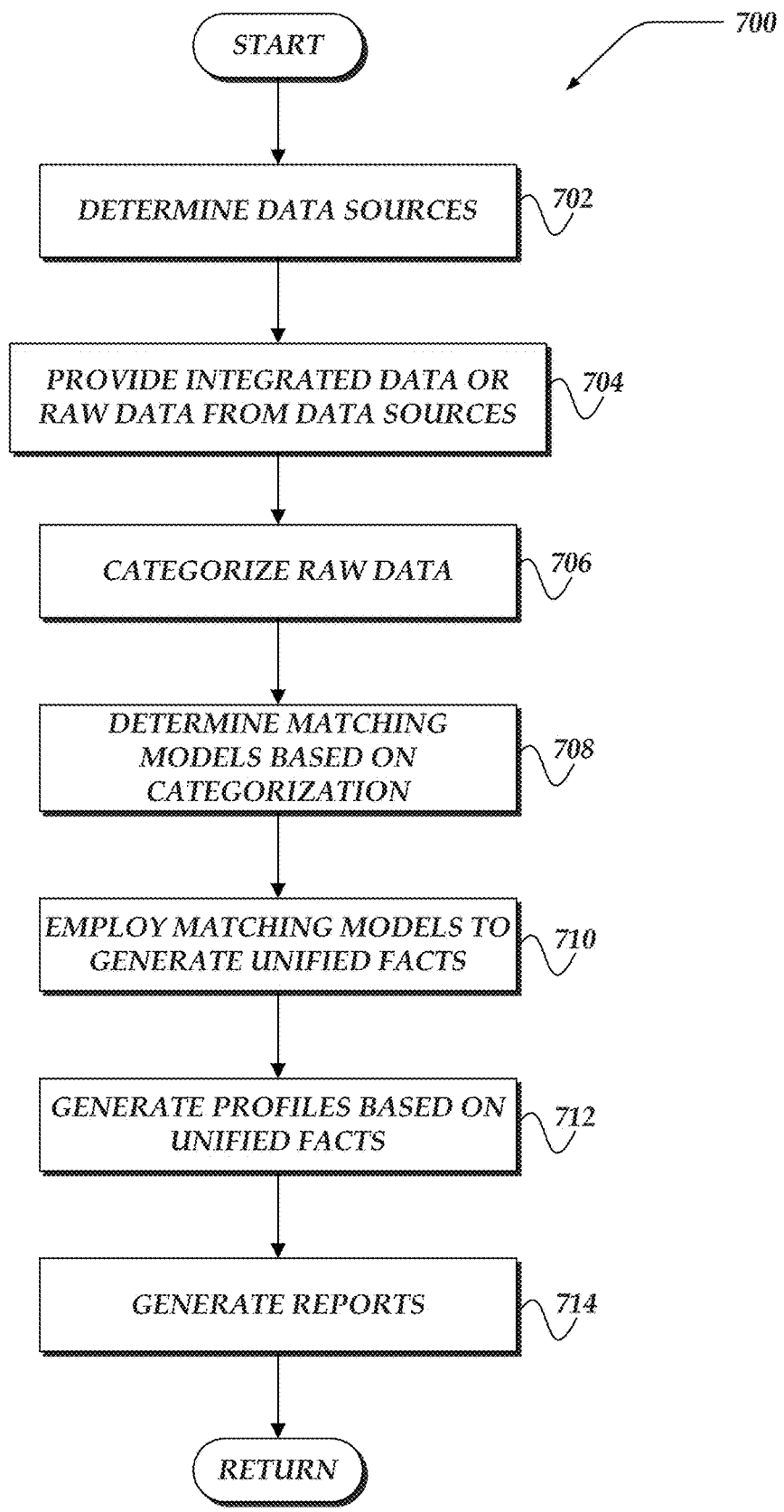
FIG. 7 illustrates an overview flowchart for a process for data ingestion platform in accordance with one or more of the various embodiments.

FIG. 7 illustrates an overview flowchart for process 700 for data ingestion platform in accordance with one or more of the various embodiments. After a start block, at block 702, in one or more of the various embodiments, one or more data sources may be determined. As described in part above and in more detail below, data ingestion platforms may be configured to collect information from one or more data sources.

At block 704, in one or more of the various embodiments, integrated data or raw data may be provided by the one or more data sources. In one or more of the various embodiments, integrated data sources may provide integrated data that may require less processing than raw data while raw data sources may provide raw data that may require additional processing.

At block 706, in one or more of the various embodiments, the data ingestion platform may be arranged to categorize the raw data. In one or more of the various embodiments, categorizing raw data may enable data ingestion platforms to employ a plurality of narrowly focused matching models each directed to particular categories. In some embodiments, matching models may be arranged to include categorization models within the matching model. In other embodiments, categorization models may be executed separately from matching models.

At block 708, in one or more of the various embodiments, the data ingestion platform may be arranged to determine one or more matching models based on the categorization of the raw data. In one or more of the various embodiments, one or more matching models may be associated with different categories of raw data.

Also, in some embodiments, a set of determined one or more matching models may be restricted based on extra-technical considerations, such as, licensing, local legal landscape, or the like.

At block 710, in one or more of the various embodiments, the data ingestion platform may be arranged to employ the one or more determined matching models to generate one or more unified facts based on information included in the raw data. As described above, in some embodiments, matching models may be employed to examine information included in raw data and attempt to map it to a unified schema to generate one or more unified facts.

At block 712, in one or more of the various embodiments, the data ingestion platform may be arranged to generate one or more profiles based on one or more unified facts. In one or more of the various embodiments, profiles may be generated to represent various subjects or entities. In some embodiments, profiles may be comprised on one or more unified facts, including one or more subject facts, one or more non-subject facts, as well as being associated with additional narrative content, styling information, user interfaces, or the like. For example, in some embodiments, a student profile may include one or more subject facts associated with that student. Likewise, for example, a school profile may include unified facts associated with a university or college. And, for example, employer profiles may include unified facts associated with an employer.

At block 714, in one or more of the various embodiments, the data ingestion platform may be arranged to generate one or more reports based on one or more requests or queries that may be provided by users or other services. In one or more of the various embodiments, reports may include unified facts, including subject facts or non-subject facts depending on the target or topic of a provided report.

In one or more of the various embodiments, data ingestion platforms may be arranged to generate one or more live reports that include interactive user interface features, such as, interactive dashboards, web pages, information displayed in mobile applications, or the like. In one or more of the various embodiments, one or more live reports may be automatically updated as underlying data or information may change. Also, in one or more of the various embodiments, live reports may include user interface features that enable report readers to drill down from information summaries to view detailed information. Further, in some embodiments, one or more live reports may include user interface features that enable active or passive feedback from users that may be provided as telemetry information to a data ingestion platforms.

Further, in one or more of the various embodiments, one or more reports may include one or more notifications, one or more events, one or more system messages, one or more error reports, one or more alarms, or the like.

Also, in one or more of the various embodiments, one or more reports may be more or less static information.

Next, in one or more of the various embodiments, control may be returned to a calling process.

Figure 8:
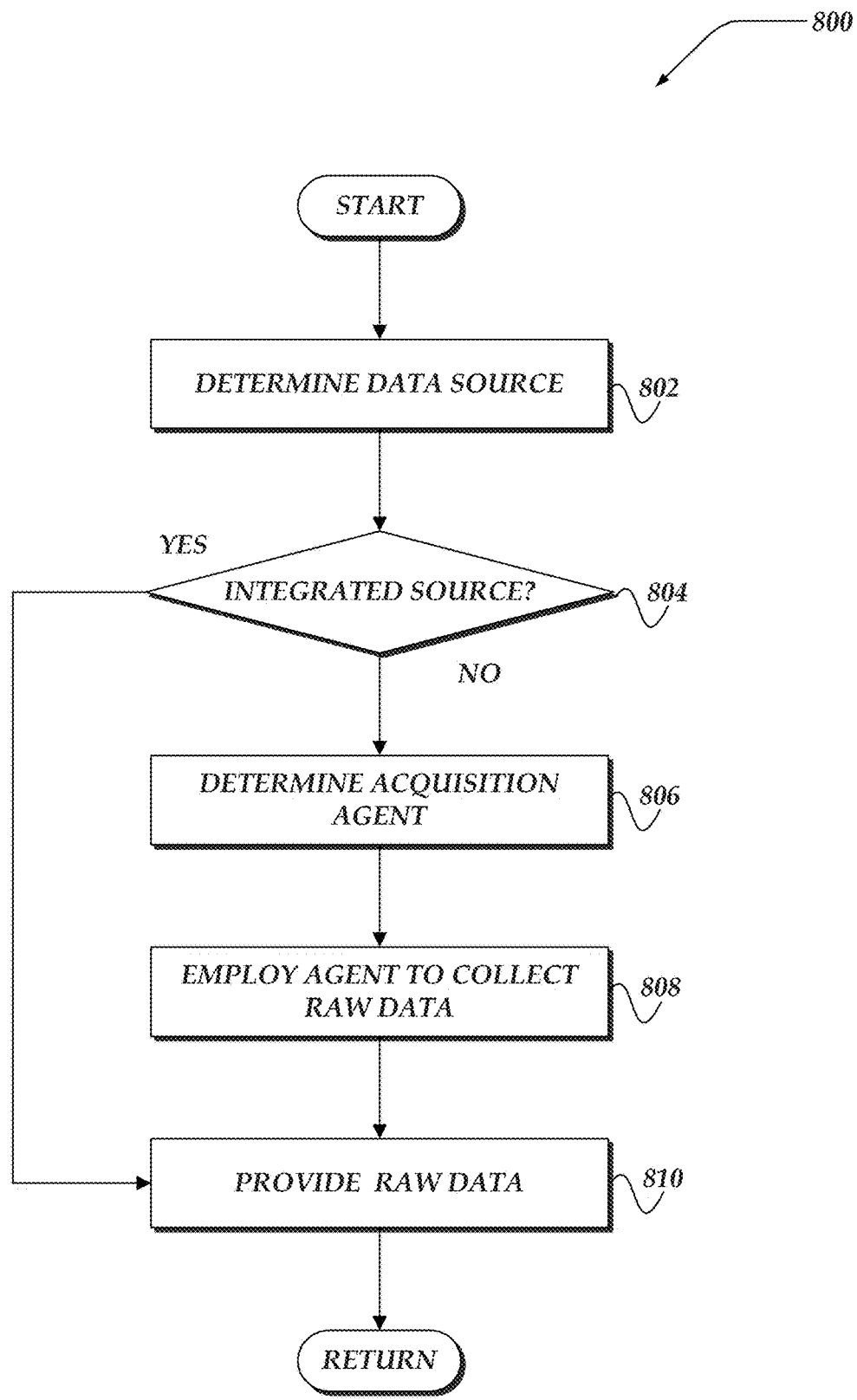
FIG. 8 illustrates a flowchart for a process for providing raw data for a data ingestion platform in accordance with one or more of the various embodiments.

FIG. 8 illustrates a flowchart for process 800 for providing raw data for a data ingestion platform in accordance with one or more of the various embodiments. After a start block, at block 802, in one or more of the various embodiments, a data source may be determined for a data ingestion platform. In one or more of the various embodiments, data ingestion platforms may be configured to employ various data sources. In some embodiments, data ingestion platforms may be arranged to employ configuration information to determine connection particulars, such as, authentication credentials, Uniform Resource Identifiers (URIs), Application Programming Interfaces (API) gateways, protocol information, or the like.

In some embodiments, acquisition engines may be arranged to scan news feeds, or the like, to identify potential data sources. Likewise, in some embodiments, acquisition engines may be arranged to register with news event services, digital clipping services, or the like, to automatically receive notifications of available relevant data sources. For example, in some embodiments, data ingestion platforms may be registered to receive notifications if universities, labor agencies, employers or the like, release press releases or reports that may be automatically collected.

Likewise, in some embodiments, data ingestion platforms may be arranged to monitor one or more social media streams or social media feeds. Accordingly, in some embodiments, if relevant information may be detected, the feed information may be determined to be a data source.

In one or more of the various embodiments, data ingestion platforms may be arranged to employ one or more filters, pattern matching, grammars, or the like, to determine if information in a given information stream or feed qualifies as a data source. Accordingly, in one or more of the various embodiments, data ingestion platforms may employ one or more of the filters, pattern, rules, instructions, grammars, or the like, that may be provided by configuration information.

At decision block 804, in one or more of the various embodiments, if the data source may be an integrated data source, control may flow to block 810; otherwise, control may flow to block 806.

In some embodiments, data ingestion platforms may be arranged to employ one or more integrated data sources. In some embodiments, integrated data sources may provide APIs, interfaces, or the like, that may be well-defined, such that the information they provide may require little if any processing. Further, in some embodiments, integrated data sources may provide information assumed to be true facts that may directly be mapped to unified facts. For example, in some embodiments, integrated data sources may provide information, such as, standardized government codes, industry standard codes, survey information, demographic information, or the like, that may be accepted at face value or with minimal processing.

At block 806, in one or more of the various embodiments, the data ingestion platform may be arranged to determine one or more acquisition agents based on the data source. In some embodiments, acquisition engines may be arranged to automatically investigate the characteristics of a data source. Accordingly, in some embodiments, acquisition engine may determine an acquisition agent based on the investigation. Also, in one or more of the various embodiments, acquisition engines may determine acquisition agents based on configuration information.

For example, for some embodiments, if a data source employs Hypertext Transfer Protocol (HTTP) and provides raw data using HTML, the acquisition engine may automatically select an acquisition agent that may include WWW user-agent capabilities to crawl the data source to obtain raw data. Likewise, for example, in one or more of the various embodiments, if the data source employs SSH File Transfer Protocol (SFTP), File Transfer Protocol (FTP), or the like, the acquisition engines may automatically select an acquisition agent that may be arranged to navigate SFTP/FTP repositories.

In one or more of the various embodiments, acquisition engines may be arranged to select acquisition agents based on inferences derived from various known characteristics of a data source, including, required credentials, URIs (e.g., schema, protocol, path format, media type, or the like), network ports (e.g., TCP/UDP application ports), URIs associated with a data sources.

In one or more of the various embodiments, acquisition agents may be provided for various industry standard protocols or applications, including, HTTP, HTML, XML, Remote Procedure Calls (RPCs), XML-RPC, REST/JSON, Simple Mail Transfer Protocol (SMTP), FTP, SFTP, Secure Shell (SSH), Secure Copy Protocol (SCP), Network File System (NFS), Remote Desktop Protocol (RDP), Real-time Transport Protocol (RTP), or the like. Also, in some embodiments, acquisition agents may be provided for various proprietary application protocols, such as, social media platforms, Enterprise Resource Planning (ERP) platforms, human resource management platforms, or the like. Further, in some embodiments, one or more custom protocols may be developed as other data provider protocols or applications may be encountered.

At block 808, in one or more of the various embodiments, the data ingestion platform may be arranged to employ the acquisition agents to collect or provide raw data associated with the data source.

In one or more of the various embodiments, one or more acquisition agents may be arranged to automatically navigate (e.g., crawl) one or more data sources. Also, in some embodiments, the one or more acquisition agents may be arranged to apply one or more filters, or the like, to selectively acquire raw data from a data source.

In some embodiments, one or more acquisition agents may be arranged to automatically execute one or more transactions to collect raw data from one or more services or applications. In some embodiments, one or more acquisition agents may be arranged to execute one or more scripts or recipes to collect raw data from a data source.

Accordingly, in one or more of the various embodiments, acquisition agents may be arranged to employ rules, instructions, filters, grammars, scripts, or the like, that may be provided via configuration information.

At block 810, in one or more of the various embodiments, the data ingestion platform may be arranged to provide the raw data from the data source.

Next, in one or more of the various embodiments, control may be returned to a calling process.

Figure 9:
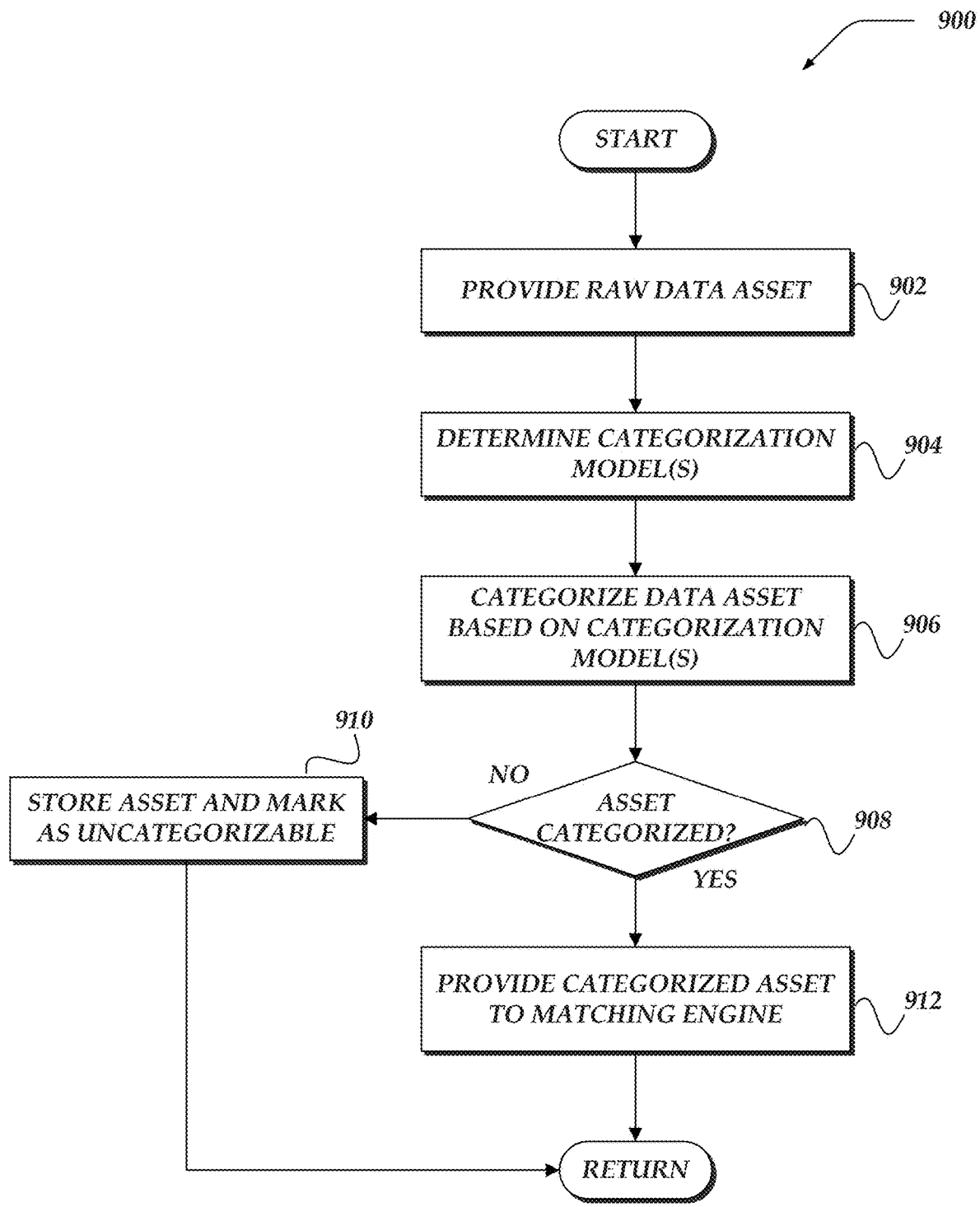
FIG. 9 illustrates a flowchart for a process for categorizing raw data for a data ingestion platform in accordance with one or more of the various embodiments.

FIG. 9 illustrates a flowchart for process 900 for categorizing raw data for a data ingestion platform in accordance with one or more of the various embodiments. After a start block, at block 902, in one or more of the various embodiments, raw data may be provided to a data ingestion platform. As described above, in some embodiments, acquisition engines may be arranged to provide raw data to ingestion engines.

At block 904, in one or more of the various embodiments, the data ingestion platform may be arranged to determine one or more categorization models. In one or more of the various embodiments, categorization models may be considered to be data structures that encapsulate the rules, instructions, machine-learning classifiers, machine-learning models, or the like, that may perform actions to categorize raw data. In one or more of the various embodiments, the determined categorization models may be selected based on the data source that may be associated with the raw data. Likewise, in some embodiments, categorization models may be selected based on the organization employing the data ingestion platform. In other embodiments, all of the categorization models may be automatically applied for each raw data asset.

At block 906, in one or more of the various embodiments, the data ingestion platform may be arranged to categorize the raw data based on the categorization models. Accordingly, in one or more of the various embodiments, the one or more determined categorization models may be executed to categorize raw data.

At decision block 908, in one or more of the various embodiments, if the raw data may be categorized, control may flow to block 914; otherwise, control may flow to decision block 910. In one or more of the various embodiments, categorization models may be arranged to provide confidence scores, or the like, that may indicate a quality of the categorization. Likewise, in some embodiments, categorization engines may be arranged to employ one or more threshold values for determining if a categorization may be successful. In some embodiments, categorization engines may be arranged to employ configuration information to determine the specific threshold value for a particular category.

At block 910, in one or more of the various embodiments, the raw data may be stored and marked as uncategorizable. In some embodiments, categorization engines or data ingestion platforms may be arranged to raise errors or notifications if categorization of the raw data fails.

In one or more of the various embodiments, one or more categorization models may be associated with different actions for handling raw data that fails to be categorized. In some embodiments, the raw data may be stored and flagged for additional review. For example, for some embodiments, failing to categorize raw data may trigger additional review of the raw data, categorization models, or the like, to determine why the raw data was not successfully categorized. Next, control may be returned to a calling process.

At block 912, in one or more of the various embodiments, the data ingestion platform may be arranged to provide the categorized raw data to a matching engine.

Note, in one or more of the various embodiments, one or more of the categorization steps may be included or defined in matching models rather than in categorization models.

Next, control may be returned to a calling process.

Figure 10:
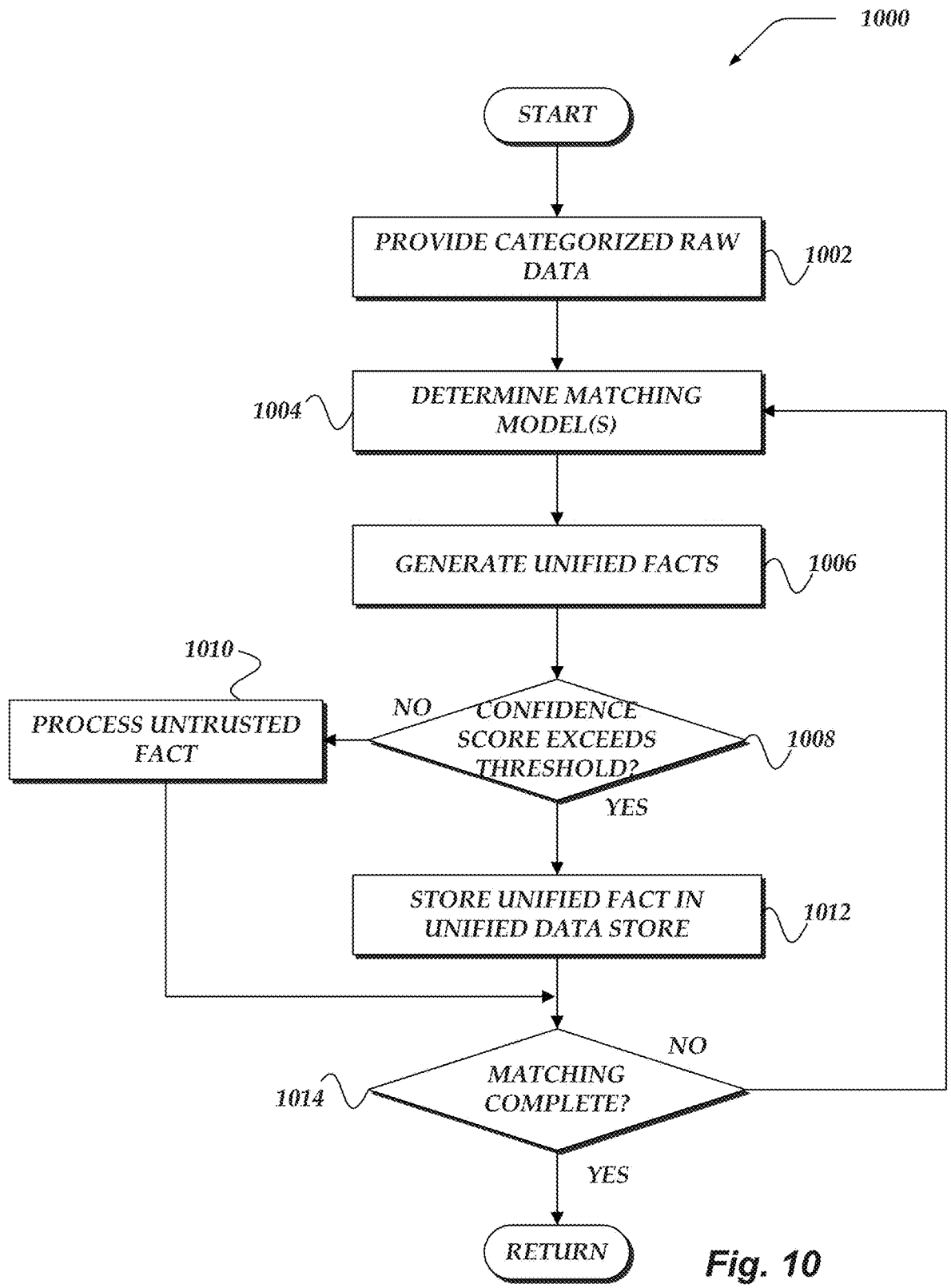
FIG. 10 illustrates a flowchart for a process for generating unified facts for a data ingestion platform in accordance with one or more of the various embodiments.

FIG. 10 illustrates a flowchart for process 1000 for generating unified facts for a data ingestion platform in accordance with one or more of the various embodiments. After a start block, at block 1002, in one or more of the various embodiments, categorized raw data may be provided to a matching engine.

At block 1004, in one or more of the various embodiments, the matching engine may be arranged to determine one or more matching models. In one or more of the various embodiments, one or more matching models may be associated with one or more data categories. Accordingly, in some embodiments, matching engines may be arranged to determine the matching models based on the category associated with the raw data.

In one or more of the various embodiments, data ingestion platforms may omit a separate categorization phase. Accordingly, in some embodiments, matching models may include one or more internal steps or phases to determine if the raw data may be processed. For example, in some embodiments, if matching models may be directed to generating unified facts from student resumes, they may include one or more initial steps to evaluate if the raw data may be a resume. In some embodiments, one or more of these initial steps may be considered similar to one or more steps performed by categorization models as discussed above.

At block 1006, in one or more of the various embodiments, the matching engine may be arranged to generate one or more unified facts based on information included in the raw data. As described above, matching models may be considered data structures that encapsulate the rules, instructions, machine-learning classifiers, machine-learning models, or the like, that may perform actions to generate unified facts from raw data information.

In one or more of the various embodiments, matching models may be arranged to have broad or narrow scope depending on how they may be arranged. For example, in some embodiments, one matching model may be directed to generating unified facts from entire student resumes whereas a narrower matching model may be directed to generating unified facts from the employment description portions of a student resume while still another narrow matching model may be directed to generating unified facts from the education description portions of a student resume. Also, in some embodiments, one or more matching models may be dedicated to determining if a unified fact may be subject fact.

In some embodiments, two or more matching models may be related or associated such that if one or more of them may be determined for use, the other may be automatically executed as well. In some embodiments, one or more sets of related or associated matching models may be required to execute in a particular sequence while other sets of related or associated matching models may be arranged to execute independently.

In one or more of the various embodiments, one or more matching models may be comprised of one or more other matching models. In some cases, for some embodiments, matching models included in another matching model may be considered matching sub-models.

In one or more of the various embodiments, matching models may be arranged to provide a confidence score with each generated unified fact that indicates the quality of the match as determined by the matching model that made the match.

At decision block 1008, in one or more of the various embodiments, if a confidence score associated with the match exceeds a defined threshold value, control may flow block 1012; otherwise, control may flow to block 1010. In one or more of the various embodiments, matching engine may be arranged to define as threshold value that may be employed to determined if a unified fact match may be considered trustworthy.

In some embodiments, different matching models or different types of matching models may be associated different trust threshold value. For example, some matching models may be known to have more sensitivity than other matching models. Likewise, in some embodiments, one or more of the unified facts one or more matching models may be arranged to match may be considered important enough to give more trust to lower quality matches than one or more other unified facts.

At block 1010, in one or more of the various embodiments, the matching engine may be arranged to process the untrusted facts. Next, in some embodiments, control may flow to decision block 1014.

In one or more of the various embodiments, one or more matching models or unified facts may be associated with different actions for handling untrusted unified fact determinations. In some embodiments, one or more untrusted unified facts may be discarded. In other embodiments, one or more untrusted unified facts may be stored and flagged for additional review. For example, for some embodiments, the generation of critical untrustworthy unified facts may trigger additional review of the raw data, matching model, or the like, to investigate why the match was not trustworthy.

At block 1012, in one or more of the various embodiments, the matching engine may be arranged to store the unified fact in a unified fact data store. As described, a unified fact database that supports the unified schema may be employed for storing unified facts along with various meta-data, such as, confidence scores, source raw data references, reference to the model that generated the unified fact, or the like.

At decision block 1014, in one or more of the various embodiments, if matching may be finished for the raw data, control may be returned to a calling process; otherwise, control may loop back to block 1004.

Next, in one or more of the various embodiments, control may be returned to a calling process.

Figure 11:
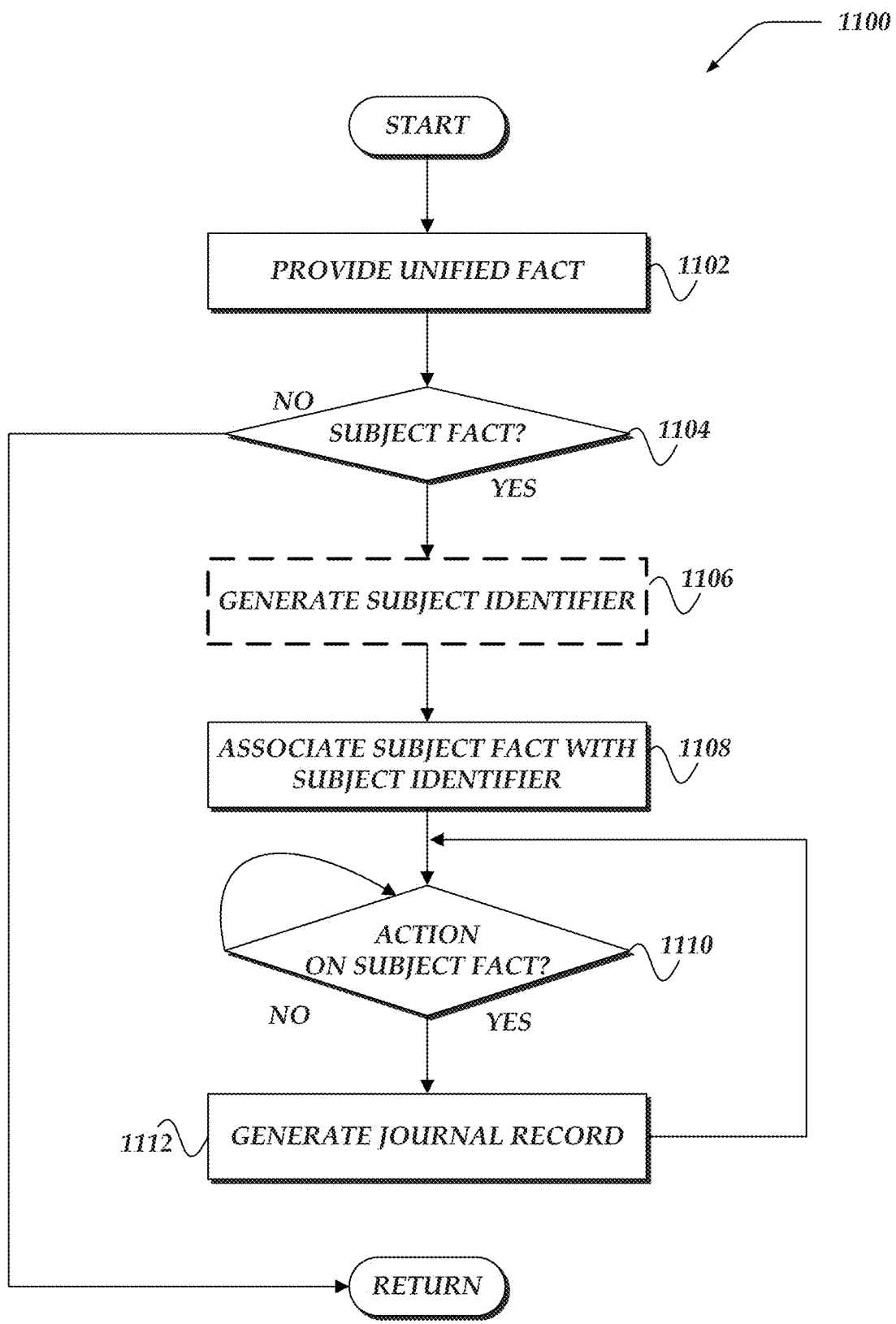
FIG. 11 illustrates a flowchart for a process for generating subject facts for a data ingestion platform in accordance with one or more of the various embodiments.

FIG. 11 illustrates a flowchart for process 1100 for generating subject facts for a data ingestion platform in accordance with one or more of the various embodiments. After a start block, at block 1102, in one or more of the various embodiments, unified facts may be arranged to be provided to matching engine. As described above, in some embodiments, data ingestion platforms may be arranged to obtain raw data that may be provided to matching engines to generate unified facts.

At decision block 1104, in one or more of the various embodiments, if the unified fact may be a subject fact, control may flow block 1106; otherwise, control may be returned to a calling process.

In one or more of the various embodiments, matching engines or matching models may be arranged to employ one or more mechanisms to determine if a unified fact may be a subject fact. In some embodiments, because the unified schema is known it may indicate if a unified fact is a subject fact or a non-subject fact. Also, in some embodiments, one or more unified facts as defined in the unified schema may be a subject fact or a non-subject depending on additional considerations. Accordingly, in one or more of the various embodiments, one or more matching models may include rules, instructions, machine-learning classifiers, or the like, for determining or inferring if a unified fact may be subject fact.

In some embodiments, data ingestion platforms may be arranged to include one or more matching models or matching sub-models that may be dedicated to determining if unified facts may be subject facts. Likewise, in one or more of the various embodiments, one or more matching models may include instructions for generating non-subject facts based on one or more unified facts (e.g., aggregates). Accordingly, in one or more of the various embodiments, such non-subject facts may be known to be non-subject facts rather than subject facts.

At block 1106, in one or more of the various embodiments, optionally, the matching engine may be arranged to generate a subject identifier associated with the subject. As described above, in some embodiments, data ingestion platforms may be arranged to associate subject facts with subject identifiers that correspond to the subject. In some embodiments, data ingestion platforms may be arranged to automatically generate subject identifiers by executing rules or instructions defined in configuration information. For example, in some embodiments, data ingestion platforms may be arranged to generate subject identifiers by executing one-way hash functions, or the like, on information associated with the subject.

Note, this block is indicated as being optional because in some cases the subject identifier of the subject associated with the subject fact may be available (e.g., previously generated, provided by another service, or the like) rather having to be generated at block 1106.

At block 1108, in one or more of the various embodiments, the matching engine may be arranged to associate the subject fact with the subject identifier. For example, the subject identifier may be stored with the subject facts in the unified fact database.

At decision block 1110, in one or more of the various embodiments, if an action may be directed to a subject fact, control may flow to block 1112; otherwise, control may loop back to decision block 1110. In one or more of the various embodiments, data ingestion platforms may be arranged to monitor actions that may impact subject facts whether the actions may be performed automatically, performed by users, or the like.

At block 1112, in one or more of the various embodiments, a journaling engine may be arranged to generate one or more journal records associated with the subject fact. As described above, in one or more of the various embodiments, a journaling engine may be arranged to generate journal records that include enough information to unwind or recreate the actions that may be applied to the subject fact. Accordingly, in some embodiments, this may enable data ingestion platforms to trace how subject facts may be used in the system. Thus, in some embodiments, data ingestion platforms may be enabled to generate reports for subjects that show how their subject facts are being employed. Likewise, in some embodiments, these journal records enable data ingestion platforms to ensure complete removal of subject facts if a subject may be removed from the data ingestion platform.

In one or more of the various embodiments, journal records may be stored in one or more journal data stores or journals. Next, control may loop back to decision block 1110.

Figure 12:
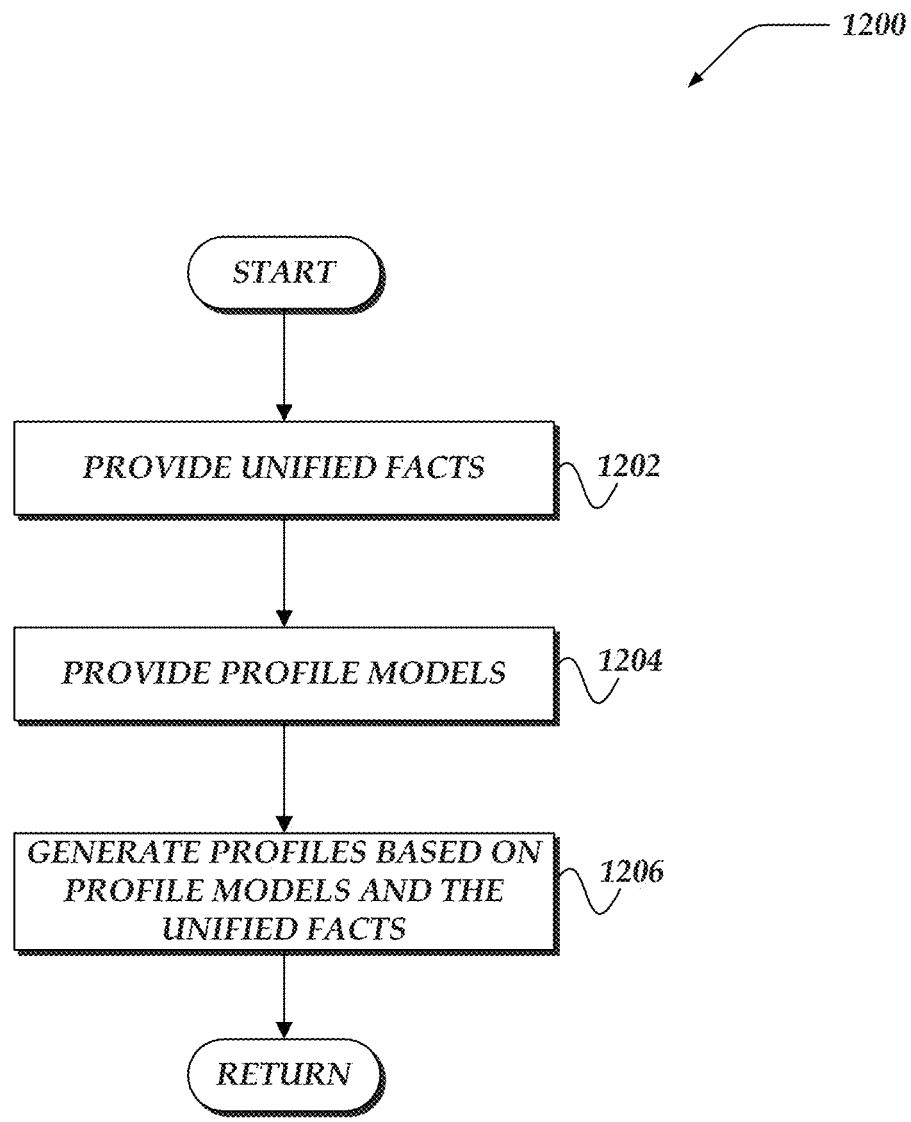
FIG. 12 illustrates a flowchart for a process for generating profiles for a data ingestion platform in accordance with one or more of the various embodiments.

FIG. 12 illustrates a flowchart for process 1200 for generating profiles for a data ingestion platform in accordance with one or more of the various embodiments. After a start block, at block 1202, in one or more of the various embodiments, unified facts may be provided to a data ingestion platform. As described above, unified facts comprising subject facts or non-subject facts may be generated by a matching engine and stored in a unified fact database.

At block 1204, in one or more of the various embodiments, the data ingestion platform may be arranged to provide one or more profile models. In one or more of the various embodiments, profile models may be data structures that encapsulate one or more actions, definitions, templates, machine-learning models, or the like, that may be employed to generate one or more profiles from unified facts. In some embodiments, profiles may be associated with various entities or concepts, such as, subjects, organizations, data sources, geographic locations, or the like. For example, in some embodiments, a simple profile model for generating student profiles may be a text based template that defines placeholders or slots for particular unified facts, such as, student name, course of study, grades, or the like. Also, for example, in some embodiments, more complex student profile models may also include or reference one or more machine-learning models or machine-learning classifiers the may be employed to generate one or more predictions, inferences, insights, or the like, about the student that may be included in the student profile.

In one or more of the various embodiments, profile models may include rules, instructions, conditions, threshold values, text, styling information, or the like, that may be obtained via configuration information.

At block 1206, in one or more of the various embodiments, the data ingestion platform may be arranged to generate one or more profiles based on the profile models and the unified facts. In some embodiments, profile models may be arranged raise errors or notifications if the unified facts available for a subject of a profile may be insufficient or unavailable. In some embodiments, profile models may include a definition of the minimum set of unified facts required for a valid profile. Likewise, in some embodiments, profile models may include one or more of floor or ceiling threshold values, acceptable range values, default values, or the like.

Also, in one or more of the various embodiments, as subject facts may be included or associated with profiles, journal records may be generated to memorialize the association or reference.

Next, in one or more of the various embodiments, control may be returned to a calling process.

Figure 13:
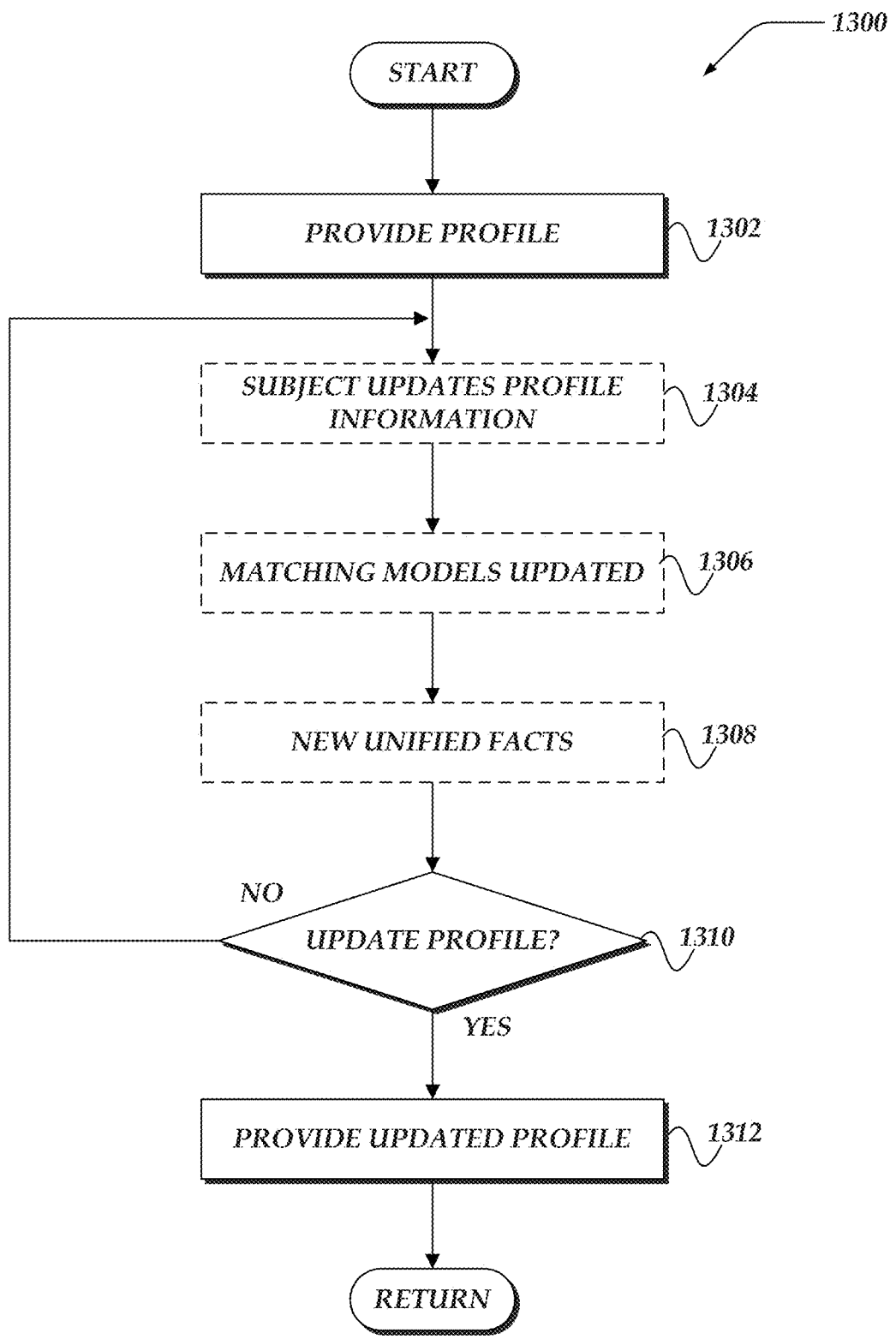
FIG. 13 illustrates a flowchart for a process for updating profiles for a data ingestion platform in accordance with one or more of the various embodiments.

FIG. 13 illustrates a flowchart for process 1300 for updating profiles for a data ingestion platform in accordance with one or more of the various embodiments. After a start block, at block 1302, in one or more of the various embodiments, one or more profiles may be provided. As described above, data ingestion platforms may be arranged to generate one or more profiles that may include or be based on one or more subject facts or non-subject facts.

At block 1304, in one or more of the various embodiments, optionally, one or more subjects may update profile information. In one or more of the various embodiments, data ingestion platforms may be arranged to provide user interfaces that enable subjects or other authorized persons to update the information included in profiles. In some embodiments, this may include updating one or more subject facts directly or adding new information to a profile. Likewise, in one or more of the various embodiments, subject updates may include grading or scoring one or more inferences that may be included in a profile.

Note, this block is marked as optional because, in some embodiments, subjects or other authorized persons may be disabled from updating or modifying one or more profiles. Alternatively, in some embodiments, subjects may refrain from providing profile information updates even if they may be enabled to update profile information.

At block 1306, in one or more of the various embodiments, optionally, one or more matching models may be updated. In one or more of the various embodiments, data ingestion platforms may be arranged to provide a variety of facilities or mechanisms that result in one or more modifications or updates to one or more matching models. For example, for some embodiments, matching models that were employed to generate one or more of the subject facts that profile information may be based on may be replaced, re-trained, or otherwise, updated. Accordingly, in one or more of the various embodiments, changes to these matching models may cast doubt on the veracity of unified facts provided by the newly modified matching models. Accordingly, in this example, one or more profiles that may rely on these potentially untrustworthy unified facts may be considered stale or untrustworthy as well.

Note, this block is marked as optional because, in some embodiments, matching models associated with the profile may not have been updated. Likewise, in some embodiments, modified or updated matching models may not always impact some or all profiles or some or all of the profile information.

At block 1308, in one or more of the various embodiments, optionally, one or more new unified facts may be added or existing unified facts may be modified. In one or more of the various embodiments, data ingestion platforms may be arranged to enable additional subject facts for a variety of reasons. In some embodiments, new data sources may be included, resulting in new or updated unified facts. Also, in some embodiments, new raw data may be provided by existing data sources. For example, if a known data source makes changes to provide additional raw data, this may result in new unified facts being added. Accordingly, in one or more of the various embodiments, some or all of the new raw data may result in update or add unified facts that may impact one or more profiles.

Note, this block is marked as optional because, in some embodiments, new or updated unified facts may not have been provided. Likewise, in some embodiments, new or additional unified facts may not always impact some or all profiles or profile information.

At decision block 1310, in one or more of the various embodiments, if the profile needs to be updated, control flows to block 1312; otherwise, control may loop back to block 1304.

In one or more of the various embodiments, data ingestion platforms may be arranged to employ one or more rules, instructions, conditions, threshold values provided via configuration information to determine if the modifications or additions such as those non-limiting examples described above, or others, may require a profile to be updated. In some embodiments, changes to one or more particular unified facts may trigger a profile to be immediately updated whereas other changes to other unified facts may not require profiles to be immediately updated. For example, in some embodiments, in some cases, new unified facts may result in new information being added to an existing profile rather than recreating the entire profile.

At block 1312, in one or more of the various embodiments, the data ingestion platforms may be arranged to provide the updated profile. In some embodiments, updating a profile may include recreating the profile from raw data. Accordingly, in some embodiments, this may include requesting additional raw data from one or more data sources and re-running the matching process. In other embodiments, profiles generated via profile models may require the profile models be re-executed to generate the updated profiles. For example, in some embodiments, profile information may include inferences or insights generated based on one or more profile models. Accordingly, in this example, if some or all of the underlying unified facts have been changed, the inferences or insights included in the profile information may become stale, requiring the entire profile to be recreated.

Accordingly, in one or more of the various embodiments, data ingestion platforms may be arranged to automatically update or recreate one or more profiles if the some or all of the underlying information contributing to the profiles may have changed. In some embodiments, this may be advantageous at least because data sources may come and go, matching models may be updated or de-ranked (e.g., if reputation scores decrease), or the like, all which may cause one or more profiles to become stale. Thus, in some embodiments, automatic profile updating may improve the quality of profile information without adding excessive burdens or resource cost to data ingestion platform operators that may be caused by manually executing individual profile updates as matching models or unified facts experience unexpected or unplanned changes.

Next, in one or more of the various embodiments, control may be returned to a calling process.

Figure 14:
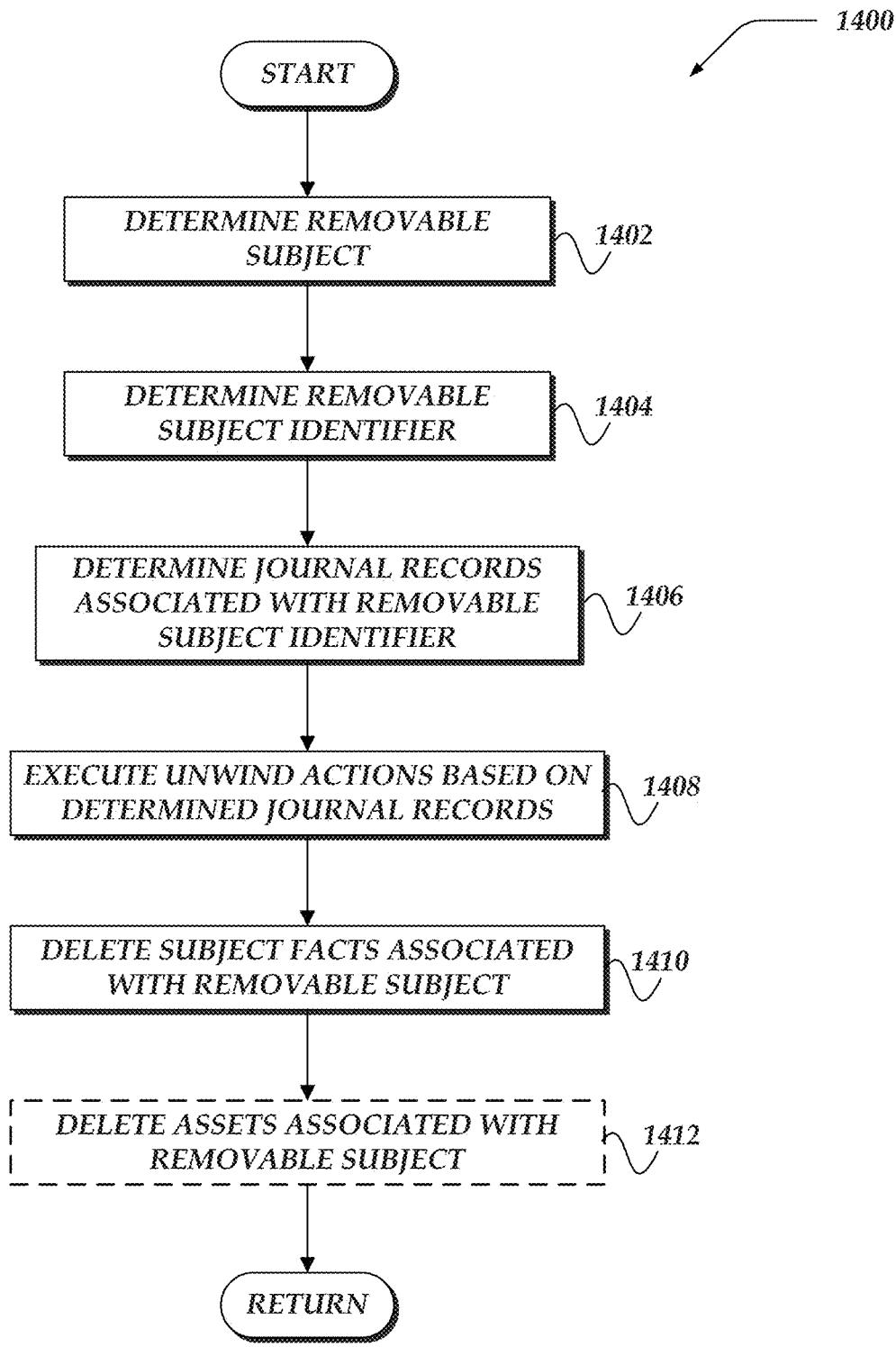
FIG. 14 illustrates a flowchart for a process for removing subjects from a data ingestion platform in accordance with one or more of the various embodiments.

FIG. 14 illustrates a flowchart for process 1400 for removing subjects from a data ingestion platform in accordance with one or more of the various embodiments. After a start block, at block 1402, in one or more of the various embodiments, one or more removable subjects may be determined. In one or more of the various embodiments, removable subjects may be subjects that for various reasons may be determined for removal from a data ingestion platform. For example, in one or more of the various embodiments, a person may provide notice that they want to be removed from the data ingestion platform. Also, for example, an organization may provide notice to sever its relationship with the data ingestion platform operator.

At block 1404, in one or more of the various embodiments, one or more subject identifiers may be determined based on the one or more removable subjects. In one or more of the various embodiments, as described above, subjects may be associated with subject identifiers. Accordingly, in some embodiments, if a removal notification omits the subject identifier, the data ingestion platform may be arranged to determine the appropriate subject identifier. In some embodiments, subjects may provide the subject identifier directly. In other embodiments, subjects may provide anonymized identifiers that may be associated with subject identifiers. Accordingly, in some embodiments, the subject identifier may be looked up from an index or database or computed on the fly based on other information associated with the subject.

At block 1406, in one or more of the various embodiments, the data ingestion platform may be arranged to determine one or more journal records that may be associated with the one or more removable subject identifiers. As described above, journal records associated with subject facts may be associated with subject identifiers of the subjects corresponding to the subject facts.

Accordingly, in one or more of the various embodiments, data ingestion platforms may be arranged to execute one or more queries, query-like operations, search operations, or the like, to determine the journal records that may be associated subject facts of the removable subjects. In some embodiments, these subject facts may be considered removable subject facts.

In one or more of the various embodiments, data ingestion platforms may be arranged to generate one or more forward or reverse indices associated with the journal records to facilitate determine the journal records associated with a subject identifier.

At block 1408, in one or more of the various embodiments, the data ingestion platform may be arranged to execute one or more unwind actions based on the journal records associated with the subject identifiers. As described above, journal records include action information that describes actions or activity that has occurred to subject facts. Accordingly, in one or more of the various embodiments, the data ingestion platform may execute one or more operations to reverse the actions (if necessary) that acted upon the subject facts. For example, for some embodiments, if a journal record shows that a subject fact was stored in the unified fact database, the data ingestion platform may execute actions to delete the subject fact from the unified fact database. Likewise, for example, if a removable subject fact has been linked or included in one or more profiles or one or more live reports, the data ingestion platform may un-link or remove the removable subject facts from those profiles or reports.

In one or more of the various embodiments, additional actions may be associated with the removal a subject fact. In some embodiments, in some circumstances the value of the removable subject fact may be replaced with a non-subject fact value, such as, a default value or aggregate value. Also, in some embodiments, entire profiles or reports may be removed depending on which subject fact may be removed.

In one or more of the various embodiments, various actions stored in the journal records may be associated different unwind actions. Accordingly, in one or more of the various embodiments, data ingestion platforms may be arranged to determine or execute unwind actions based on rules, instructions, or the like, provided via configuration information. Thus, in one or more of the various embodiments, different organizations may be enabled modify unwind actions based on local conditions.

Note, in some embodiments, rather than seeking to be removed, subjects may request a report or accounting of their subject facts that may be known to the data ingestion platform or how those subject facts may be used in the data ingestion platform. Likewise, in some embodiments, subjects may request a report or accounting of actions taken with their subject facts. In some embodiments, data ingestion platforms may be arranged to provide subjects one or more reports that disclose the subject facts associated with the requesting subjects. Likewise, in some embodiments, data ingestion platforms may be arranged to provide a report that shows how the subject facts associated with a subject have been used in the data ingestion platform. For example, for some embodiments, a subject report may include a list of that subject's subject facts and a list of reports, profiles, or the like, that include some or all of the those subject facts.

Accordingly, in some embodiments, journal records may be employed to reconstruct the actions associated with subject facts or subjects as well as creating lists of all subject facts associated with a subject.

At block 1410, in one or more of the various embodiments, the data ingestion platform may be arranged to delete one or more subject facts associated with the one or more removable subjects. In some embodiments, at the conclusion of unwind operations, remaining subject facts for the subject, if any, may be deleted from the data ingestion platform.

Alternatively, in some embodiments, if the subject has requested a report regarding the use or existence of their subject facts, the data ingestion platform may be arranged to generate the requested reports rather than deleting the subject facts.

At block 1412, in one or more of the various embodiments, optionally, the data ingestion platform may be arranged to delete one or more raw data assets that may be associated with the one or more removable subjects. In some embodiments, data ingestion platforms may store additional data assets that may be provided with or as raw data, such as, documents, or the like. Likewise, in some embodiments, subjects may be enabled to add notes or annotations to their profiles, or the like. Accordingly, in one or more of the various embodiments, some or all of these assets may not strictly be stored as unified facts. Thus, in some embodiments, assets associated with a subject may be deleted as part of the removal process. For example, assets may be stored or linked to a subject identifier that may be employed to determined and delete removable assets.

Note, this block is indicated as optional because, in some embodiments, data ingestion platforms may not have data assets (e.g., documents) stored for one or more subjects. For example, in some embodiments, data ingestion platforms may be arranged to discard or delete raw data after the information included in the raw data has been mapped to unified facts.

Next, in one or more of the various embodiments, control may be returned to a calling process.

Figure 15:
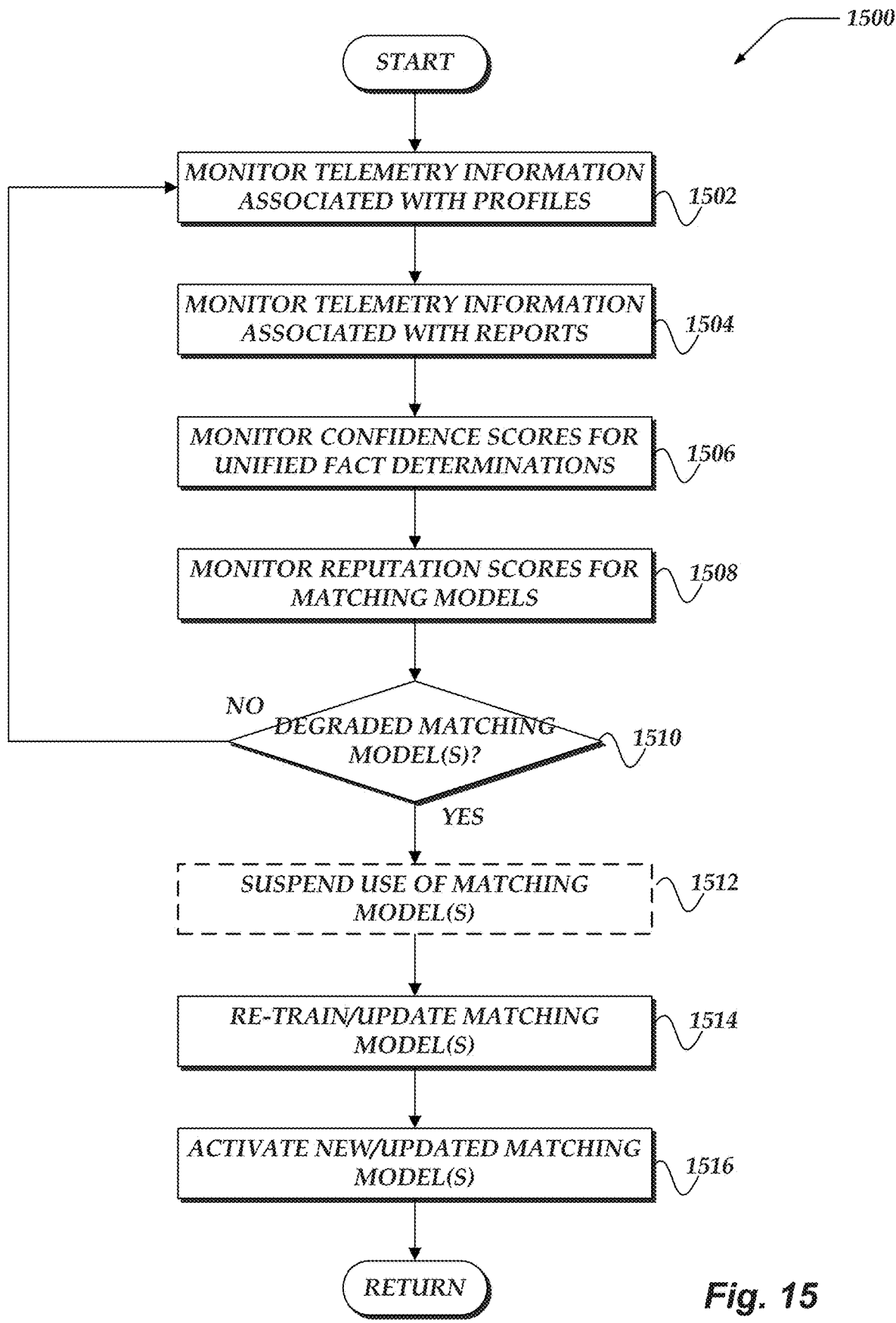
FIG. 15 illustrates a flowchart for a process for updating matching models based on user telemetry for a data ingestion platform in accordance with one or more of the various embodiments.

FIG. 15 illustrates a flowchart for process 1500 for updating matching models based on user telemetry for a data ingestion platform in accordance with one or more of the various embodiments. After a start block, at block 1502, in one or more of the various embodiments, a data ingestion platform may be arranged to monitor telemetry information associated with one or more profiles. As described above, one or more unified facts may be assembled in profiles that may be provided to various users depending on the type of profile or role of users.

Accordingly, in some embodiments, data ingestion platforms may be arranged to provide one or more facilities to collect direct feedback from one or more of the users that may interact with one or more profiles. For example, in some embodiments, user interfaces that display profiles may include controls that enable authorized users to grade one or more portions of a profile. Likewise, in some embodiments, a user interface may be provided to grade the entire profile.

In some embodiments, grades or scores may be binary (e.g., like/dislike), discrete (e.g., one-four stars, letter grades), continuous values, or the like.

Also, in one or more of the various embodiments, data ingestion platforms may be arranged to provide user interfaces that monitor how users employ profiles. In some embodiments, telemetry information employed to monitor user preferences may be based on monitoring user interactions with profiles as well as direct feedback. Accordingly, in some embodiments, profiles that may appear well-formed but are ignored or discarded by users may be inferred to be poorly received. For example, for some embodiments, if the top ranked profiles provided in response to a query, or the like, are ignored or lower ranked profiles are favored by users, it may be inferred that there may be a problem with the composition of the top ranked profiles for the current application.

Further, in some embodiments, the data ingestion platforms may be arranged to receive telemetry information from other services or applications. Accordingly, in one or more of the various embodiments, data ingestion platforms are not required to directly monitor activity associated with the profiles. For example, for some embodiments, profiles may be displayed to users via desktop computer applications, mobile applications, web-based applications, or the like. In some embodiments, such applications may collect the telemetry information and provide some or all it to data ingestion platforms rather than requiring the data ingestion platforms to include monitoring facilities on user-side application.

At block 1504, in one or more of the various embodiments, the data ingestion platform may be arranged to monitor telemetry information associated with one or more reports. Similar to how telemetry may be generated for profiles, telemetry information for reports may be generated and monitored.

At block 1506, in one or more of the various embodiments, the data ingestion platform may be arranged to monitor confidence scores associated with unified fact determinations. In one or more of the various embodiments, as described herein, matching engines may associate confidence scores that represent the quality of match with unified fact values. Accordingly, in one or more of the various embodiments, data ingestion platforms may be arranged to monitor whether confidence scores for one or more types of unified facts or individual unified facts begin trending lower. Likewise, in some embodiments, unexpected changes or spikes in confidence scores may be detected. For example, if one or more matching models unexpectedly begins to produce maximum confidence score (e.g., 100%) or minimum scores (e.g., 0%), this may be monitored and reported.

Also, in one or more of the various embodiments, user feedback associated profiles, or reports may be monitored to determine if there may be positive or negative correlations with confidence scores. For example, in one or more of the various embodiments, negative user feedback associated with high confidence scores may be unexpected whereas negative user feedback associated with low confidence scores may be expected.

At block 1508, in one or more of the various embodiments, the data ingestion platform may be arranged to monitor reputation scores associated with matching models. As described herein, matching models may be associated with reputation scores that may represent the quality of confidence scores and results produced by the matching models. Accordingly, data ingestion platforms may monitor changes or trends in reputation scores for matching models.

At decision block 1510, in one or more of the various embodiments, if one or more degraded matching models may be determined, control may flow to block 1512; otherwise, control may loop back to block 1502. In one or more of the various embodiments, periodically or continuously, data ingestion platforms may be arranged to employ telemetry information to determine if one or more matching models may be degrading. In one or more of the various embodiments, evidence of degradation may include downward trending confidence scores, downward trending reputation scores, downward trending profile feedback, downward trending report feedback, or the like. Also, one of ordinary skill in the art will appreciate that there may be other metrics that may provide evidence of matching model degradation, such as, increasing or decreasing variability, changes in sensitivity, or the like.

In one or more of the various embodiments, matching models that were considered high performing may be become poorly performing overtime for a variety of reasons, such as, gradual changes in raw data, changes in user expectations, introduction of new data sources, or the like. Accordingly, in one or more of the various embodiments, automatic detection of matching model degradation enables data ingestion platforms to stay effective and current in the face of gradual or immediate changes to raw data. For example, for some embodiments, overtime universities may change or modify the language they use for course descriptions, student outcomes, demographic information, or the like.

In one or more of the various embodiments, data ingestion platforms may employ blanket rules, such as, determining any model having a reputation less than a defined threshold as being degraded. Likewise, in some embodiments, individual matching models or classes of matching models may be associated separate rules for determining if they may be degraded.

Further, in some embodiments, one or more administrators may be enabled to directly review telemetry information to identify matching models that may be degraded.

In one or more of the various embodiments, data ingestion platforms may be arranged to employ rules, instructions, conditions, or the like, provided via configuration information to make determination if a matching model may be performing poorly or otherwise may be degraded.

Accordingly, in some embodiments, organizations may be enabled to tune performance expectations based on local consideration.

At block 1512, in one or more of the various embodiments, optionally, the data ingestion platform may be arranged to suspend to use of one or more matching models.

Note, this block may be optional because, in some embodiments, one or more matching models may remain in production until they may be replaced rather than automatically suspending the use of degraded matching models.

At block 1514, in one or more of the various embodiments, the data ingestion platform may be arranged to re-train or update the one or more degraded matching models that may be selected for re-training or updating.

In one or more of the various embodiments, data ingestion platforms may be arranged to discard one or more degraded matching models rather than re-training or updating them.

At block 1516, in one or more of the various embodiments, the data ingestion platform may be arranged to activate one or more of the re-trained or updated matching models. Also, in some embodiments, one or more of the degraded matching models may be discarded or replaced.

Accordingly, in one or more of the various embodiments, one or more of the replacement matching models may be activated to replace discarded degraded matching models.

Next, in one or more of the various embodiments, control may be returned to a calling process.

Figure 16:
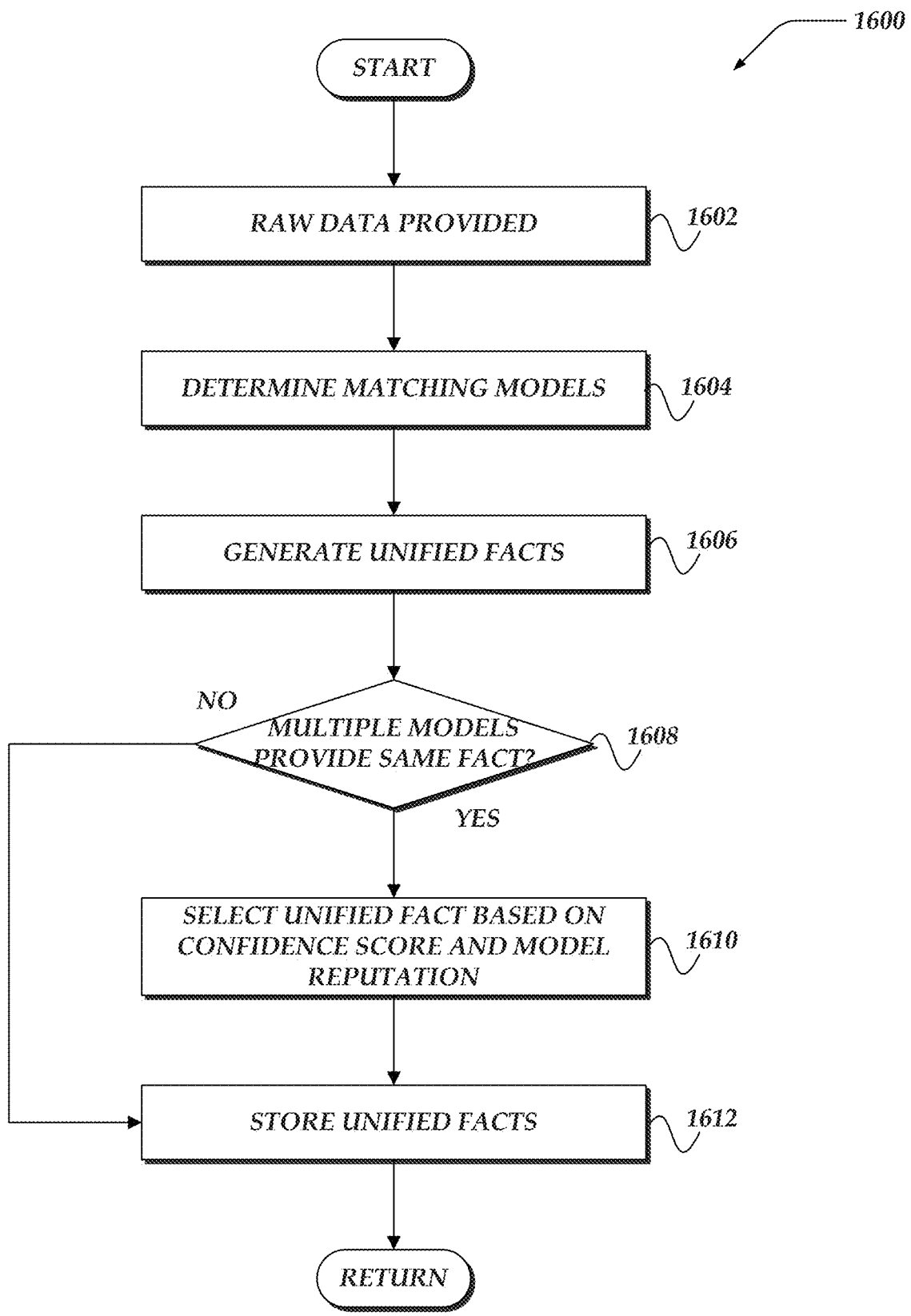
FIG. 16 illustrates a flowchart for a process for generating unified facts for a data ingestion platform in accordance with one or more of the various embodiments.

FIG. 16 illustrates a flowchart for process 1600 for generating unified facts for a data ingestion platform in accordance with one or more of the various embodiments. After a start block, at block 1602, in one or more of the various embodiments, raw data may be provided to a data ingestion platform. As described above, raw data provided from various data sources may be acquired and pre-processed or provided to an ingestion engine.

At block 1604, in one or more of the various embodiments, the data ingestion platform may be arranged to determine one or more matching models. As described above, one or more matching models may be determined for evaluating the raw data. In some embodiments, the matching models may be selected based on a categorization of the raw data. In some embodiments, one or more matching models may be arranged to determine if the raw data may be suitable for a given model.

At block 1606, in one or more of the various embodiments, the data ingestion platform may be arranged to generate one or more unified facts from the information included in the raw data. As described above, the matching engine may employ the selected matching models to determine one or more unified facts from information included in the raw data.

At decision block 1608, in one or more of the various embodiments, if multiple matching models provide the same unified fact, control may flow to block 1610; otherwise, control may flow to block 1612.

In one or more of the various embodiments, more than one matching model may be determined to be employed or executed to evaluate the same raw data. In some embodiments, different matching models may provide different values for the same unified fact. For example, in one or more of the various embodiments, matching model A may determine that the unified fact 'course name' is Calculus 3 and matching model B may determine that the 'course name' is Linear Algebra 2 from the same raw data.

At block 1610, in one or more of the various embodiments, the data ingestion platform may be arranged to select a unified fact from among the determined unified facts based on a confidence score or a reputation score associated with the matching models. As described above, each matching model that determines a unified fact may be arranged to associate a confidence score with the determined unified fact. However, in some embodiments, because matching models may be arranged to self-evaluate the produced results, the reputation score of the matching model may be employed to weight the confidence scores. For example, for some embodiments, if two matching models produce different results each with high confidence, the results produced by the matching model having a higher reputation score may be selected over matching models with lower reputation scores. In some embodiments, data ingestion platforms may determine the particular rule for selecting results based on confidence score and reputation scores based on rules, instructions, formulas, or the like, stored in configuration information. Accordingly, in some embodiments, different organizations may be enabled to adjust the relative weights of model confidence versus model reputation to meet local conditions. For example, for some embodiments, a selection score S may be defined by $S=aC+bR$ where C is the confidence score provided by the matching model and R is the reputation score of the matching model, and a and b are constants. Thus, in this example, the unified fact value associated with the higher selection score may be preferred.

Also, in one or more of the various embodiments, data ingestion platforms may be arranged to accept more than one value for the same unified fact. Accordingly, in one or more of the various embodiments, each value may be stored along with its selection score or confidence score. Thus, in some embodiments, applications that employ the unified facts may determine how the different unified fact values may be handled.

At block 1612, in one or more of the various embodiments, the data ingestion platform may be arranged to store the unified facts. In some embodiments, one or more of the selection score, confidence score, reputation score, or the like, may be stored with the unified fact to provide insight to downstream applications or services regarding the quality of the match that provided the unified fact value.

In one or more of the various embodiments, data ingestion platforms may be arranged to store more than one value for the same unified fact. Accordingly, in one or more of the various embodiments, each value may be stored along with its selection score or confidence score. Thus, in some embodiments, applications that employ the unified facts may determine how the different unified fact values may be handled.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of data ingestion over a network, using one or more network computers that employ one or more processors to execute the method by performing actions, comprising:
    providing raw data and integrated data associated with a plurality of separate data sources, wherein the raw data includes content associated with a plurality of subjects;
    employing one or more categorization models to categorize one or more portions of the raw data based on one or more of a format of the raw data, a structure of the raw data, a data source providing the raw data, a volume of the raw data, variability of the raw data, or an entity associated with the data source;
    determining one or more matching models based on the categorization of the one or more portions of the raw data, the integrated data and the content associated with the plurality of subjects;
    employing the one or more matching models to generate a plurality of unified facts based on the raw data and the integrated data, wherein each unified fact is associated with a confidence score representing a quality of match between the raw data and integrated data used to generate the unified fact and a unified schema, and wherein the plurality of unified facts includes both a plurality of subject facts that are associated with the plurality subjects and a plurality of non-subject facts, and wherein one or more subject identifiers are associated with each subject fact;
    generating a reputation score for each of the one or more matching models, each reputation score representing a quality of its corresponding matching model of the one or more matching models in generating the plurality of unified facts;
        wherein for each matching model of the one or more matching models,
            comparing the reputation score corresponding to the matching model to a defined set of metrics to determine if the matching model is degrading, and
            if the matching model is determined as degrading, performing one or more of the actions of suspending use of the matching model, re-training the matching model, updating the matching model, replacing the matching model, or discarding the matching model;
    generating a plurality of journal records associated with the plurality of subject facts, wherein the plurality of journal records include information that is used to trace unwinding of one or more actions applied to one or more of the plurality of subject facts, and wherein a forward index and a reverse index for the plurality of journal records is employed to determine each journal record associated with the one or more subject identifiers that are associated with one or more subject facts that are removable, and wherein the traced unwinding enables removal of the one or more subject facts in response to removal of one or more subjects;
    employing one or more profile models to generate one or more profiles that correspond to each subject based on the plurality of unified facts, wherein the one or more profiles include one or more subject facts and one or more non-subject facts; and
    providing one or more reports based on the one or more profiles.

2. The method of claim 1, wherein associating the one or more subject identifiers with each subject fact, further comprises: corresponding each subject identifier with a subject of the plurality of subjects that is associated with each subject fact; generating one or more records of one or more actions associated with the one or more profiles, wherein each record includes the one or more subject identifiers associated with each subject fact associated with the one or more actions; employing the one or more records to determine the one or more removable subject facts based on a subject identifier associated with a removable subject; and removing the one or more removable subject facts from the one or more profiles.

3. The method of claim 1, further comprising: providing one or more raw data sources;
   determining one or more communication protocols associated with the one or more raw data sources;
   determining one or more acquisition agents for the one or more raw data sources based on the one or more communication protocols; and employing the one or more acquisition agents to provide the raw data.

4. The method of claim 1, wherein providing raw data associated with the plurality of separate data sources, further comprises: providing one or more data sources associated with one or more educational institutions, including one or more of a university, a college, vocational school, or a k-12 school; employing the one or more data sources associated with the one or more educational institutions to provide a portion of the plurality of subject facts, wherein the portion of the plurality of subject facts include one or more of student transcripts, student coursework, student extracurricular activities, student resumes, student discipline information, or student self-reporting information; and
   employing the one or more data sources associated with the one or more educational institutions to provide a portion of the plurality of non-subject facts, wherein the portion of the plurality of non-subject facts include one or more of course catalogs, course syllabi, program information, or tuition information.

5. The method of claim 1, wherein providing raw data associated with the plurality of separate data sources, further comprises: providing one or more data sources associated with one or more employers; employing the one or more data sources associated with the one or more employers to provide a portion of the plurality of subject facts, wherein the portion of the plurality of subject facts include one or more of individual employee compensation information, individual employee performance review information; individual employee satisfaction information, individual employee resumes, individual employee application information, individual employee interview information, or individual employee exit interview information; and employing the one or more data sources associated with the one or more employers to provide a portion of the plurality of non-subject facts, wherein the portion of the plurality of non-subject facts include one or more of job descriptions, job advertisement information, or aggregate employee demographic information.

6. The method of claim 1, further comprising: providing a categorization confidence score that is associated with the categorization of the one or more portions of the raw data; and in response to the categorization confidence score being less than a threshold value, performing further actions, including one or more of triggering additional review of the one or more portions of raw data, triggering a review of the one or more categorization models, generating one or more notifications associated with the one or more portions of raw data.

7. The method of claim 1, wherein generating the plurality of unified facts, further comprises:
   determining one or more untrusted facts based on an associated quality of match score being less than a threshold value, wherein the threshold value is a different value for different matching models; and
   performing one or more actions, including one or more discarding the one or more untrusted facts, storing the one or more untrusted facts in another data store, triggering a review of the one or more untrusted facts, or triggering a review of the one or more matching models.

8. A system for data ingestion, comprising: a network computer, comprising:
   a transceiver that communicates over the network;
   a memory that stores at least instructions; and
   one or more processors that execute instructions that perform actions, including:
      providing raw data and integrated data associated with a plurality of separate data sources, wherein the raw data includes content associated with a plurality of subjects;
      employing one or more categorization models to categorize one or more portions of the raw data based on one or more of a format of the raw data, a structure of the raw data, a data source providing the raw data, a volume of the raw data, variability of the raw data, or an entity associated with the data source;
      determining one or more matching models based on the categorization of the one or more portions of the raw data, the integrated data and the content associated with the plurality of subjects;
      employing the one or more matching models to generate a plurality of unified facts based on the raw data and the integrated data, wherein each unified fact is associated with a confidence score representing a quality of match between the raw data and integrated data used to generate the unified fact and a unified schema, and wherein the plurality of unified facts includes both a plurality of subject facts that are associated with the plurality subjects and a plurality of non-subject facts, and wherein one or more subject identifiers are associated with each subject fact;
      generating a reputation score for each of the one or more matching model, each reputation score representing a quality of its corresponding matching models of the one or more matching models in generating the plurality of unified facts,
      wherein for each matching model of the one or more matching models,
         comparing the reputation score corresponding to the matching model to a defined set of metrics to determine if the matching model is degrading, and
         if the matching model is determined as degrading, performing one or more of the actions of suspending use of the matching model, re-training the matching model, updating the matching model, replacing the matching model, or discarding the matching model;
      generating a plurality of journal records associated with the plurality of subject facts, wherein the plurality of journal records include information that is used to trace unwinding of one or more actions applied to one or more of the plurality of subject facts, and wherein a forward index and a reverse index for the plurality of journal records is employed to determine each journal record associated with the one or more subject identifiers that are associated with one or more subject facts that are removable, and wherein the traced unwinding enables removal of the one or more subject facts in response to removal of one or more subjects;

employing one or more profile models to generate one or more profiles that correspond to each subject based on the plurality of unified facts, wherein the one or more profiles include one or more subject facts and one or more non-subject facts; and providing one or more reports based on the one or more profiles; and a client computer, comprising:
a transceiver that communicates over the network;
a memory that stores at least instructions; and
one or more processors that execute instructions that perform actions, including:
display one or more of the one or more reports on a hardware display.

9. The system of claim 8, wherein associating the one or more subject identifiers with each subject fact, further comprises: corresponding each subject identifier with a subject of the plurality of subjects that is associated with each subject fact; generating one or more records of one or more actions associated with the one or more profiles, wherein each record includes the one or more subject identifiers associated with each subject fact associated with the one or more actions; employing the one or more records to determine the one or more removable subject facts based on a subject identifier associated with a removable subject; and removing the one or more removable subject facts from the one or more profiles.

10. The system of claim 8, wherein the one or more network computer processors execute instructions that perform actions, further comprising: providing one or more raw data sources;
determining one or more communication protocols associated with the one or more raw data sources;
determining one or more acquisition agents for the one or more raw data sources based on the one or more communication protocols; and employing the one or more acquisition agents to provide the raw data.

11. The system of claim 8, wherein providing raw data associated with the plurality of separate data sources, further comprises: providing one or more data sources associated with one or more educational institutions, including one or more of a university, a college, a vocational school, primary school, or a secondary school; employing the one or more data sources associated with the one or more educational institutions to provide a portion of the plurality of subject facts, wherein the portion of the plurality of subject facts include one or more of student transcripts, student coursework, student extracurricular activities, student resumes, student discipline information, or student self-reporting information; and employing the one or more data sources associated with the one or more educational institutions to provide a portion of the plurality of non-subject fact, wherein the portion of the plurality of non-subject facts include one or more of course catalogs, course syllabi, program information, or tuition information.

12. The system of claim 8, wherein providing raw data associated with the plurality of separate data sources, further comprises: providing one or more data sources associated with one or more employers; employing the one or more data sources associated with the one or more employers to provide a portion of the plurality of subject facts, wherein the portion of the plurality of subject facts include one or more of individual employee compensation information, individual employee performance review information; individual employee satisfaction information, individual employee resumes, individual employee application information, individual employee interview information, and individual employee exit interview information; and employing the one or more data sources associated with the one or more employers to provide a portion of the plurality of non-subject facts, wherein the portion of the plurality of non- subject facts include one or more of job descriptions, job advertisement information, or aggregate employee demographic information.

13. The system of claim 8, wherein the one or more network computer processors execute instructions that perform actions, further comprising: providing a categorization confidence score that is associated with the categorization of the one or more portions of the raw data; and in response to the categorization confidence score being less than a threshold value, performing further actions, including one or more of triggering additional review of the one or more portions of raw data, triggering a review of the one or more categorization models, generating one or more notifications associated with the one or more portions of raw data.

14. The system of claim 8, wherein generating the plurality of unified facts, further comprises:
determining one or more untrusted facts based on an associated quality of match score being less than a threshold value, wherein the threshold value is a different value for different matching models; and
performing one or more actions, including one or more discarding the one or more untrusted facts, storing the one or more untrusted facts in another data store, triggering a review of the one or more untrusted facts, or triggering a review of the one or more matching models.

15. A processor readable non-transitory storage media that includes instructions for data ingestion over a network, wherein execution of the instructions by one or more processors performs actions, comprising:
providing raw data and integrated data associated with a plurality of separate data sources, wherein the raw data includes content associated with a plurality of subjects;
employing one or more categorization models to categorize one or more portions of the raw data based on one or more of a format of the raw data, a structure of the raw data, a data source providing the raw data, a volume of the raw data, variability of the raw data, or an entity associated with the data source;
determining one or more matching models based on the categorization of the one or more portions of the raw data, the integrated data and the content associated with the plurality of subjects;
employing the one or more matching models to generate a plurality of unified facts based on the raw data and the integrated data, wherein each unified fact is associated with a confidence score representing a quality of match between the raw data and integrated data used to generate the unified fact and a unified schema, and wherein the plurality of unified facts includes both a plurality of subject facts that are associated with the plurality subjects and a plurality of non-subject facts, and wherein one or more subject identifiers are associated with each subject fact;
generating a reputation score for each of the one or more matching models, each reputation score representing a quality of its corresponding matching model of the one or more matching models in generating the plurality of unified facts,
wherein for each matching model of the one or more matching models, comparing the reputation score corresponding to the matching model to a defined set of metrics to determine if the matching model is degrading, and
if the matching model is determined as degrading, performing one or more of the actions of suspending use of the matching model, re-training the matching model, updating the matching model, replacing the matching model, or discarding the matching model;
generating a plurality of journal records associated with the plurality of subject facts, wherein the plurality of journal records include information that is used to trace unwinding of one or more actions applied to one or more of the plurality of subject facts, and wherein a forward index and a reverse index for the plurality of journal records is employed to determine each journal record associated with the one or more subject identifiers that are associated with one or more subject facts that are removable, and wherein the traced unwinding enables removal of the one or more subject facts in response to removal of one or more subjects;
employing one or more profile models to generate one or more profiles that correspond to each subject based on the plurality of unified facts, wherein the one or more profiles include one or more subject facts and one or more non-subject facts; and
providing one or more reports based on the one or more profiles.

16. The media of claim 15, wherein associating the one or more subject identifiers with each subject fact, further comprises: corresponding each subject identifier with a subject of the plurality of subjects that is associated with each subject fact; generating one or more records of one or more actions associated with the one or more profiles, wherein each record includes the one or more subject identifiers associated with each subject fact associated with the one or more actions;
employing the one or more records to determine the one or more removable subject facts based on a subject identifier associated with a removable subject; and removing the one or more removable subject facts from the one or more profiles.

17. The media of claim 15, further comprising: providing one or more raw data sources;
determining one or more communication protocols associated with the one or more raw data sources;
determining one or more acquisition agents for the one or more raw data sources based on the one or more communication protocols; and employing the one or more acquisition agents to provide the raw data.

18. The media of claim 15, wherein providing raw data associated with the plurality of separate data sources, further comprises: providing one or more data sources associated with one or more educational institutions, including one or more of a university, a college, vocational school, primary school, or a secondary school; employing the one or more data sources associated with the one or more educational institutions to provide a portion of the plurality of subject facts, wherein the portion of the plurality of subject facts include one or more of student transcripts, student coursework, student extracurricular activities, student resumes, student discipline information, or student self-reporting information; and employing the one or more data sources associated with the one or more educational institutions to provide a portion of the plurality of non-subject facts, wherein the portion of the plurality of non-subject facts include one or more of course catalogs, course syllabi, program information, or tuition information.

19. The media of claim 15, wherein providing raw data associated with the plurality of separate data sources, further comprises: providing one or more data sources associated with one or more employers; employing the one or more data sources associated with the one or more employers to provide a portion of the plurality of subject facts, wherein the portion of the plurality of subject facts include one or more of individual employee compensation information, individual employee performance review information; individual employee satisfaction information, individual employee resumes, individual employee application information, individual employee interview information, or individual employee exit interview information; and employing the one or more data sources associated with the one or more employers to provide a portion of the plurality of non-subject facts, wherein the portion of the plurality of non-subject facts include one or more of job descriptions, job advertisement information, or aggregate employee demographic information.

20. The media of claim 15, further comprising: providing a categorization confidence score that is associated with the categorization of the one or more portions of the raw data; and in response to the categorization confidence score being less than a threshold value, performing further actions, including one or more of triggering additional review of the one or more portions of raw data, triggering a review of the one or more categorization models, generating one or more notifications associated with the one or more portions of raw data.

21. The media of claim 15, wherein generating the plurality of unified facts, further comprises:
determining one or more untrusted facts based on an associated quality of match score being less than a threshold value, wherein the threshold value is a different value for different matching models; and
performing one or more actions, including one or more discarding the one or more untrusted facts, storing the one or more untrusted facts in another data store, triggering a review of the one or more untrusted facts, and triggering a review of the one or more matching models.

22. A network computer for data ingestion over a network, comprising:
a transceiver that communicates over the network;
a memory that stores at least instructions; and
one or more processors that execute instructions that perform actions, including:
providing raw data and integrated data associated with a plurality of separate data sources, wherein the raw data includes content associated with a plurality of subjects;
employing one or more categorization models to categorize one or more portions of the raw data based on one or more of a format of the raw data, a structure of the raw data, a data source providing the raw data, a volume of the raw data, variability of the raw data, or an entity associated with the data source;
determining one or more matching models based on the categorization of the one or more portions of the raw data, the integrated data and the content associated with the plurality of subjects;

employing the one or more matching models to generate a plurality of unified facts based on the raw data and the integrated data, wherein each unified fact is associated with a confidence score representing a quality of match between the raw data and integrated data used to generate the unified fact and a unified schema, and wherein the plurality of unified facts includes both a plurality of subject facts that are associated with the plurality subjects and a plurality of non-subject facts, and wherein one or more subject identifiers are associated with each subject fact;

generating a reputation score for each of the one or more matching models, each reputation score representing a quality of its corresponding matching model of the one or more matching models in generating the plurality of unified facts, wherein for each matching model of the one or more matching models, comparing the reputation score corresponding to the matching model to a defined set of metrics to determine if the matching model is degrading, and if the matching model is determined as degrading, performing one or more of the actions of suspending use of the matching model, re-training the matching model, updating the matching model, replacing the matching model, or discarding the matching model;

generating a plurality of journal records associated with the plurality of subject facts, wherein the plurality of journal records include information that is used to trace unwinding of one or more actions applied to one or more of the plurality of subject facts, and wherein a forward index and a reverse index for the plurality of journal records is employed to determine each journal record associated with the one or more subject identifiers that are associated with one or more subject facts that are removable, and wherein the traced unwinding enables removal of the one or more subject facts in response to removal of one or more subjects;

employing one or more profile models to generate one or more profiles that correspond to each subject based on the plurality of unified facts, wherein the one or more profiles include one or more subject facts and one or more non-subject facts; and providing one or more reports based on the one or more profiles.

23. The network computer of claim 22, wherein associating the one or more subject identifiers with each subject fact, further comprises: corresponding each subject identifier with a subject of the plurality of subjects that is associated with each subject fact; generating one or more records of one or more actions associated with the one or more profiles, wherein each record includes the one or more subject identifiers associated with each subject fact associated with the one or more actions; employing the one or more records to determine the one or more removable subject facts based on a subject identifier associated with a removable subject; and removing the one or more removable subject facts from the one or more profiles.

24. The network computer of claim 22, wherein the one or more processors execute instructions that perform actions: providing one or more raw data sources; determining one or more communication protocols associated with the one or more raw data sources; determining one or more acquisition agents for the one or more raw data sources based on the one or more communication protocols; and employing the one or more acquisition agents to provide the raw data.

25. The network computer of claim 22, wherein providing raw data associated with the plurality of separate data sources, further comprises: providing one or more data sources associated with one or more educational institutions, including one or more of a university, a college, vocational school, primary school, or a secondary school; employing the one or more data sources associated with the one or more educational institutions to provide a portion of the plurality of subject facts, wherein the portion of the plurality of subject facts include one or more of student transcripts, student coursework, student extracurricular activities, student resumes, student discipline information, or student self-reporting information; and employing the one or more data sources associated with the one or more educational institutions to provide a portion of the plurality of non-subject facts, wherein the portion of the plurality of non-subject facts include one or more of course catalogs, course syllabi, program information, or tuition information.

26. The network computer of claim 22, wherein providing raw data associated with the plurality of separate data sources, further comprises: providing one or more data sources associated with one or more employers; employing the one or more data sources associated with the one or more employers to provide a portion of the plurality of subject facts, wherein the portion of the plurality of subject facts include one or more of individual employee compensation information, individual employee performance review information; individual employee satisfaction information, individual employee resumes, individual employee application information, individual employee interview information, or individual employee exit interview information; and employing the one or more data sources associated with the one or more employers to provide a portion of the plurality of non-subject facts, wherein the portion of the plurality of non- subject facts include one or more of job descriptions, job advertisement information, or aggregate employee demographic information.

27. The network computer of claim 22, wherein the one or more processors execute instructions that perform actions: providing a categorization confidence score that is associated with the categorization of the one or more portions of the raw data; and in response to the categorization confidence score being less than a threshold value, performing further actions, including one or more of triggering additional review of the one or more portions of raw data, triggering a review of the one or more categorization models, generating one or more notifications associated with the one or more portions of raw data.

28. The network computer of claim 22, wherein generating the plurality of unified facts, further comprises: determining one or more untrusted facts based on an associated quality of match score being less than a threshold value, wherein the threshold value is a different value for different matching models; and performing one or more actions, including one or more discarding the one or more untrusted facts, storing the one or more untrusted facts in another data store, triggering a review of the one or more untrusted facts, or triggering a review of the one or more matching models.

* * * * *